(12) United States Patent
Oh et al.

(10) Patent No.: US 11,006,158 B2
(45) Date of Patent: May 11, 2021

(54) BROADCAST SIGNAL TRANSMISSION DEVICE, BROADCAST SIGNAL RECEPTION DEVICE, BROADCAST SIGNAL TRANSMISSION METHOD, AND BROADCAST SIGNAL RECEPTION METHOD

(71) Applicant: LG Electronics Inc., Seoul (KR)

(72) Inventors: Sejin Oh, Seoul (KR); Jongyeul Suh, Seoul (KR); Jangwon Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 67 days.

(21) Appl. No.: 16/303,398

(22) PCT Filed: May 18, 2017

(86) PCT No.: PCT/KR2017/005182
§ 371 (c)(1),
(2) Date: Nov. 20, 2018

(87) PCT Pub. No.: WO2017/200322
PCT Pub. Date: Nov. 23, 2017

(65) Prior Publication Data
US 2020/0107051 A1 Apr. 2, 2020

Related U.S. Application Data

(60) Provisional application No. 62/339,101, filed on May 20, 2016.

(51) Int. Cl.
*H04N 21/2362* (2011.01)
*H04N 21/434* (2011.01)
(Continued)

(52) U.S. Cl.
CPC ..... *H04N 21/2362* (2013.01); *H04N 21/4345* (2013.01); *H04N 21/84* (2013.01); *H04N 21/85406* (2013.01)

(58) Field of Classification Search
CPC ........... H04N 21/2362; H04N 21/4345; H04N 21/84; H04N 21/85406
See application file for complete search history.

(56) References Cited

U.S. PATENT DOCUMENTS 8,584,160 B1 11/2013 Huang et al.
2009/0055417 A1* 2/2009 Hannuksela ..... H04N 21/85406
(Continued)

FOREIGN PATENT DOCUMENTS

KR 1020090030081 3/2009
KR 20090035460 A * 4/2009 ............... H04N 5/76
(Continued)

OTHER PUBLICATIONS

TNO, "Framework for temporal orchestration—More proposal," ISO/IED JTC1/SC29/WG11 MPEG2016/m38227, MPEG Requirements + Systems, dated May 30, 2016, Geneva, CH, 30 pages, XP030066583.
(Continued)

*Primary Examiner* — Randy A Flynn
(74) *Attorney, Agent, or Firm* — Fish & Richardson P.C.

(57) ABSTRACT

According to one embodiment of the present invention, a broadcast signal transmission device comprises: one or more source modules for outputting a timed media data stream and a timed metadata stream for the timed media data stream, wherein the timed metadata stream includes a position metadata stream having position information of the one or more source modules, or an orientation metadata stream having orientation information of the one or more source modules; and a transmission interface for transmitting a data signal, wherein the timed media data stream and the timed metadata stream are respectively formatted into a file format based on an ISO BMFF in sample units, and the transmission interface can transmit, through a transmission network,
(Continued)

a data signal including an ISO BMFF file, which includes the timed media data stream and the timed metadata stream.

18 Claims, 28 Drawing Sheets

(51) Int. Cl.
*H04N 21/84* (2011.01)
*H04N 21/854* (2011.01)

(56) References Cited

U.S. PATENT DOCUMENTS

| | | | | |
|---|---|---|---|---|
| 2009/0199100 | A1* | 8/2009 | Hwang | G11B 27/32 715/723 |
| 2012/0102042 | A1* | 4/2012 | Flick | H04N 21/84 707/746 |
| 2013/0188922 | A1* | 7/2013 | Furbeck | H04N 5/772 386/239 |
| 2014/0036048 | A1 | 2/2014 | Furbeck | |
| 2014/0351318 | A1* | 11/2014 | Friedrich | H04N 21/2362 709/203 |
| 2015/0334413 | A1* | 11/2015 | Gorin | H04N 21/85406 375/240.26 |
| 2016/0105478 | A1* | 4/2016 | Oyman | H04N 21/84 709/217 |

FOREIGN PATENT DOCUMENTS

| | | | | |
|---|---|---|---|---|
| KR | 20100029137 A | * | 3/2010 | ....... H04N 21/85406 |
| KR | 20100043108 A | * | 4/2010 | ........... G06F 16/489 |
| KR | 1020120020208 | | 3/2012 | |

OTHER PUBLICATIONS

Requirements, Systems, "Context and Objectives for Media Orchestration v.3," ISO/IEC JTC1/SC29/WG11 N 16131, MPEG 114, dated Feb. 2016, San Diego, CA, US, 30 pages, XP030022804.

3rd Generation Partnership Project; Technical Specification Group Services and System Aspects; Packet-switched Streaming Service (PSS); "Improved Support for Dynamic Adaptive Streaming over HTTP in 3GPP (Release 13)," 3GPP TR 26.938 V13.0.0, dated Dec. 15, 2015, 98 pages, XP051046679.

Systems subgroup, "Text of ISO/IEC 13818-1:2015/ AMD 6—Carriage of Quality Metadata in MPEG-2 systems," ISO/IEC JTC1/SC29/WG11, MPEG2016/ N15914, dated Feb. 2016, San Diego, CA, U.S.A., 8 pages, XP030022588.

Yuste et al., "Understanding Timelines Within MPEG Standards," IEEE Communications Surveys & Tutorials, vol. 18, No. 1, First Quarter, dated Jan. 27, 2016, 33 pages, XP011597157.

Extended European Search Report in European Application No. 17799679.0, dated Sep. 3, 2019, 10 pages.

PCT International Search Report and Written Opinion in International Appln. PCT/KR2017/005182, dated Aug. 24, 2017, 19 pages (with English translation).

* cited by examiner

FIG. 5

| GlobalPositionSensorCapabilityType { | (No. of bits) | (Mnemonic) |
|---|---|---|
| SensoryDeviceCapabilityBase | | SensorCapabilityBaseType |
| latitudeOffsetFlag | 1 | bslbf |
| longitudeOffsetFlag | 1 | bslbf |
| maxOperatingTempFlag | 1 | bslbf |
| minOperatingTempFlag | 1 | bslbf |
| VariousAccuracyCount | 32 | uimsbf |
| for (i=1;i<VariousAccuracyCount;i++) { | | |
|    accuracyType | 8 | AccuracyTypeCS |
|    value | 32 | fbf |
|    accuracyUnit | 8 | bslbf |
| } | | |
| crs | | UTF-8 |
| if(latitudeOffsetFlag){ | | |
|    latitudeOffset | 32 | fsbf |
| } | | |
| if(longitudeOffsetFlag){ | | |
|    longitudeOffset | 32 | Fsbf |
| } | | |
| if(maxOperatingTempFlag){ | | |
|    maxOperatingTemp | 32 | fsbf |
| } | | |
| if(minOperatingTempFlag) | | |
|    minOperatingTemp | 32 | fsbf |
| } | | |
| } | | |

| Name | Definition |
|---|---|
| Name | Describes the degree of closeness of a measured quantity of longitude to its actual value in AccuracyType. |
| LatitudeAccuracy | Describes the degree of closeness of a measured quantity of latitude to its actual value in AccuracyType. |
| offset | Describes the value added to a base value of longitude in order to get to a specific absolute value. |
| VariousAccuracy | Describes the accuracy in various point of view. Each occurrence of this element defines one type of accuracy. This element defines the accuracy by using three attriubtes defined. |
| accuracyType | This attribute specifies the accuracy type, e.g., distance accuracy or reacquisition time, |
| value | This attribute specifies the value of the accuracy. |
| accuracyUnit | This attribute specifies the unit of the accuracy description |
| crs | Specifies the URI of the coordinate reference system based on which the values of longitude, latitude and altitude are given. The default is urn:ogc:def:crs:EPSG::4326 specifying the Coordinate Reference System (CRS) with code 4326 specified in the EPSG database |
| longitudeOffset | Describes the value added to a base value of longitude in order to get to a specific absolute value. |
| latitudeOffset | Describes the value added to a base value of latitude in order to get to a specific absolute value. |
| maxOperatingTemp | Describes the number of locations that a bend sensor can sense bending angles. |
| maxOperatingTemp | Describes the distance between the adjacent sensing locations. |

FIG. 6

| PositionSensorCapabilityType { | (Number of bits) | (Mnemonic) |
|---|---|---|
| SensorCapabilityBase | | SensorCapabilityBaseType |
| range | | RangeType |
| } | | |
| RangeType { | | |
| XminValue | 32 | fsbf |
| XmaxValue | 32 | fsbf |
| YminValue | 32 | fsbf |
| YmaxValue | 32 | fsbf |
| ZminValue | 32 | fsbf |
| ZmaxValue | 32 | fsbf |
| } | | |

| Name | Definition |
|---|---|
| unit | Describes the unit of the sensor's measuring value. |
| Range | Describes the range that the position sensor can perceive in terms of RangeType in its global coordinate system.<br><br>NOTE The minValue and the maxValue in the SensorCapabilityBaseType are not used for this sensor. |
| RangeType | Defines the range in a local coordinate system relative to the position of the sensor in idle state according to the x-, y-, and z-axis. |
| XminValue | Describes the minimum value that the position sensor can perceive along the x-axis in the unit of meter. |
| XmaxValue | Describes the maximum value that the position sensor can perceive along the x-axis in the unit of meter. |
| YminValue | Describes the minimum value that the position sensor can perceive along the y-axis in the unit of meter. |
| YmaxValue | Describes the maximum value that the position sensor can perceive along the y-axis in the unit of meter. |
| ZminValue | Describes the minimum value that the position sensor can perceive along the z-axis in the unit of meter. |
| ZmaxValue | Describes the maximum value that the position sensor can perceive along the z-axis in the unit of meter. |

FIG. 7

| AltitudeSensorCapabilityType { | (Number of bits) | (Mnemonic) |
|---|---|---|
| SensorCapabilityBase | | SensorCapabilityBaseType |
| } | | |

FIG. 8

| SensorCapabilityBaseType { | (Number of bits) | (Mnemonic) |
|---|---|---|
| AccuracyFlag | 1 | bslbf |
| TerminalCapabilityBase | | TerminalCapabilityBaseType |
| if(AccuracyFlag){ | | |
| Accuracy | | AccuracyType |
| } | | |
| SensorCapabilityBaseAttributes | | SensorCapabilityBaseAttributesType |
| } | | |

| Name | Definition |
|---|---|
| SensorCapabilityBaseType | provides a base abstract type for a subset of types defined as part of the sensor device capability metadata types. |
| AccuracyFlag | This field signals the presence of the accuracy attribute. |
| Accuracy | Describes the degree of closeness of a measured quantity to its actual value as AccuracyType. |
| sensorCapabilityBase Attributes | Describes a group of attributes for the sensor capabilities. |

| AccuracyType { | (Number of bits) | (Mnemonic) |
|---|---|---|
| AccuracySelect | 2 | bslbf |
| if(AccuracySelect==00){ | | |
| PercentAccuracy | 32 | fsbf |
| } else if (AccuracySelect==01) { | | |
| ValueAccuracy | 32 | fsbf |
| } | | |
| } | | |

| Name | Definition |
|---|---|
| AccuracyType | Becomes a parent type providing a choice of describing the accuracy in either relative value or absolute value. |
| AccuracySelect | This field describes which accuracy scheme is used. "0" means that the PercentAccuracy type shall be used, and "1" means that the ValueAccuracy type shall be used. |
| PercentAccuracy | Describes the degree of closeness of a measured quantity to its actual value in a relative way using a value ranging from 0 to 1.0. |
| value | Provides an actual value in a relative way for accuracy where value 0 means 0 % accuracy and value 1.0 means 100 % accuracy. |
| ValueAccuracy | Describes the degree of closeness of a measured quantity to its actual value in an absolute value of given unit. |
| value | Provides an actual value in an absolute way, where the value means the possible range of error as (-value, +value) of given unit. |

FIG. 9

| SensorCapabilityBaseAttributesType { | (Number of bits) | (Mnemonic) |
|---|---|---|
| unitFlag | 1 | bslbf |
| maxValueFlag | 1 | bslbf |
| minValueFlag | 1 | bslbf |
| offsetFlag | 1 | bslbf |
| numOfLevelsFlag | 1 | bslbf |
| sensitivityFlag | 1 | bslbf |
| SNRFlag | 1 | bslbf |
| if(unitFlag){ | | |
| unit | 8 | bslbf |
| } | | |
| if(maxValueFlag){ | | |
| maxValue | 32 | fsbf |
| } | | |
| if(minValueFlag){ | | |
| minValue | 32 | fsbf |
| } | | |
| if(offsetFlag){ | | |
| offset | 32 | fsbf |
| } | | |
| if(numOfLevelsFlag){ | | |
| numOfLevels | 16 | uimsbf |
| } | | |
| if(sensitivityFlag){ | | |
| sensitivity | 32 | fsbf |
| } | | |
| if(SNRFlag){ | | |
| SNR | 32 | fsbf |
| } | | |
| } | | |

| Name | Definition |
|---|---|
| unitFlag | This field signals the presence of the unit attribute. |
| maxValueFlag | This field signals the presence of the maxValue attribute. |
| minValueFlag | This field signals the presence of the minValue attribute |
| offsetFlag | This field signals the presence of the offset attribute |
| numOfLevelsFlag | This field signals the presence of the numOfLevel attribute |
| sensitivityFlag | This field signals the presence of the sensitivity attribute |
| SNRFlag | This field signals the presence of the SNR attribute |
| unit | Describes the unit of the sensor's measuring value. if a unit other than the default unit specified in the semantics of the maxValue and minValue is used for the values of maxValue and minValue are used. |
| maxValue | Describes the maximum value that the sensor can perceive. The terms will be different according to the individual sensor type. |
| minValue | Describes the minimum value that the sensor can perceive. The terms will be different according to the individual sensor type. |
| offset | Describes the number of value locations added to a base value in order to get to a specific absolute value. |
| numOfLevels | Describes the number of value levels that the sensor can perceive in between maximum and minimum value. For example, The value 5 means the sensor can perceive 5 steps from minValue to maxValue. |
| sensitivity | Describes the minimum magnitude of input signal required to produce a specified output signal in given unit. |
| SNR | Describes the ratio of a signal power to the noise power corrupting the signal. |

FIG. 10

| GlobalPositionSensorType{ | (Number of bits) | Mnemonic |
|---|---|---|
| SensedInfoBaseType | | SensedInfoBaseType |
| latitude | 32 | fsfb |
| longitude | 32 | fsfb |
| } | | |

| Name | Definition |
|---|---|
| longitude | Describes the position of the sensor in terms of degrees of longitude. Positive values represent eastern longitude and negative values represent western longitude. |
| latitude | Describes the position of the sensor in terms of degrees of latitude. Positive value represents northern latitude and negative value represents southern latitude. |

FIG. 11

| AltitudeSensorType{ | (Number of bits) | Mnemonic |
|---|---|---|
| SensedInfoBaseType | | SensedInfoBaseType |
| crs | | UTF-8 |
| altitude | 32 | fsfb |
| } | | |

| Name | Definition |
|---|---|
| crs | Specifies the URI of the coordinate reference system based on which the values of longitude, latitude and altitude are given. The default is urn:ogc:def:crs:EPSG::4326 specifying the Coordinate Reference System (CRS) with code 4326 specified in the EPSG database |
| altitude | Describes the altitude in the unit of meters. |

FIG. 12

| PositionSensorType { | Number of bits | Mnemonic |
|---|---|---|
|    UpdateMode | 1 | bslbf |
|    if(UpdateMode ==0){ | | |
|       PositionSensorNormal | | PositionSensorNormalType |
|    }else{ | | |
|       PositionSensorUpdate | | PositionSensorUpdateType |
|    } | | |
| } | | |

| UpdateMode | This field signals whether the sensed information is on the normal mode or on the update mode. A value of "1" means the update mode is used and "0" means the normal mode is used. |
|---|---|

| PositionSensorNormalType{ | Number of bits | Mnemonic |
|---|---|---|
|    positionFlag | 1 | bslbf |
|    unitFlag | 1 | bslbf |
|    SensedInfoBaseType | | SensedInfoBaseTypeType |
|    if(positionFlag) { | | |
|      position | | Float3DVectorType |
|    } | | |
|    if(unitFlag) { | | |
|      unit | | unitType |
|    } | | |
| } | | |

| Name | Definition |
|---|---|
| Position | Describes the 3D value of the position sensor in the unit of meter (m). The origin of the coordinate can be the position of the object sensed at the time of sensor activation. If a calibration has been performed on the position of the sensor, the origin can be the position after the calibration. If this sensed information is used with the PositionSensorCapability information, the origin of the coordinate shall be defined in the PositionSensorCapability. |
| Position | Specifies the unit of the sensed value, if a unit other than the default unit is used |

FIG. 13

| SensedInfoBaseType{ | Number of bits | Mnemonic |
|---|---|---|
| TimeStampFlag | 1 | bslbf |
| SensedInfoBaseAttributes | | SensedInfoBaseAttributesType |
| If(TimeStampFlag){ | | |
| TimeStamp | | TimeStampType |
| } | | |
| } | | |

| Name | Definition |
|---|---|
| sensedInfoBaseAttributes | Describes a group of attributes for the sensed information. |
| TimeStamp | Provides the time information at which the sensed information is acquired. |
| TimeStampFlag | This field signals the presence of the TimeStamp element |

| SensedInfoBaseAttributesType{ | Number of bits | Mnemonic |
|---|---|---|
| IDFlag | 1 | bslbf |
| sensorIdRefFlag | 1 | bslbf |
| linkedlistFlag | 1 | bslbf |
| groupIDFlag | 1 | bslbf |
| priorityFlag | 1 | bslbf |
| activateFlag | 1 | bslbf |
| If(IDFlag) { | | |
| ID | | UTF-8 |
| } | | |
| if(sensorIdRefFlag) { | | |
| sensorIdRef | | UTF-8 |
| } | | |
| if(linkedlistFlag) { | | |
| linkedlist | | UTF-8 |
| } | | |
| if(groupIDFlag) { | | |
| groupID | | UTF-8 |
| } | | |
| If(priorityFlag) { | | |
| priority | 32 | uimsbf |
| } | | |
| if(activateFlag) { | | |
| activate | 1 | bslbf |
| } | | |
| } | | |

| Name | Definition |
|---|---|
| IDFlag | This field signals the presence of the ID attribute |
| sensorIdRefFlag | This field signals the presence of the sensorIdRef attribute |
| linkedlistFlag | This field signals the presence of the linkedlist attribute |
| groupIDFlag | This field signals the presence of the groupID attribute |
| id | Unique identifier for identifying individual sensed information |
| sensorIdRef | References a sensor device that has generated the information included in this specific sensed information. |
| linkedlist | Describes the multi-sensor structure that consists of a group of sensors in a way that each record contains a reference to the ID of the next sensor. |
| groupID | Identifier for a group multi-sensor structure to which this specific sensor belongs. |
| activate | Describes whether the sensor is activated. |
| priority | Describes a priority for sensed information with respect to other sensed information sharing the same point in time when the sensed information becomes adapted. A value of one indicates the highest priority and larger values indicate lower priorities. The default value of the priority is one. If there are more than one sensed information with the same priority, the order of process can be determined by the Adaptation engine itself. |

FIG. 14

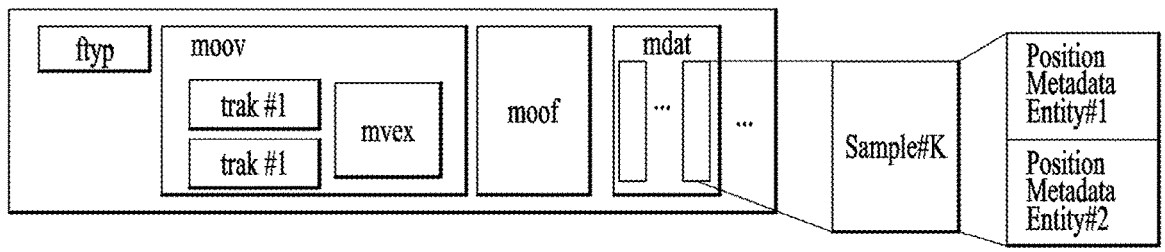

FIG. 15

```
aligned(8) class PositionMetadataSampleEntry() extends MetadataSampleEntry ('pmse') {
     PositionMetadataConfigurationBox();
}
```

```
aligned(8) class PositionMetadataConfigurationBox extends FullBox('pmcb', version=0, 0) {
    unsigned       int(8)           entity_count
    for(int i=1; i<= entity_count; i++) {
        unsigned int(16)            entity_size_bytes;
        unsigned int(7)             entity_encoding;
        unsigned int(1)             sensor_capability_included;
        unsigned int(32)            position_entity_code;
        if(entity_encoding == 0x01) {   //XML format
            string     content_encoding; // optional
            string     namespace;
            string     schema_location; // optional
            BitRateBox (); // optional
        }
        if(sensor_capability_included == '1') {
            PositionSensorCapability(position_entity_code, entity_encoding);
        }
    }
}
```

FIG. 16

```
unsigned int(7) entity_encoding;
unsigned int(1) sensor_capability_included;
unsigned int(24) position_entity_type;
```

FIG. 17

```
aligned(8) class PositionMetadataSample() {
    for(int i=1; i<= entity_count; i++) {
        if(sensor_capability_included == '1') {
            PositionSensorCapability(position_entity_code, entity_encoding);
        }
        PositionMetadataEntity(position_entity_code, entity_encoding);
    }
}
```

```
class PositionSensorCapability(unsigned int(32) position_entity_code, unsigned int(8) entity_encoding = 0)
{
    if(entity_encoding == 0) { //binary encoding
        unsinged int(8) cap_size_bytes;
        if(position_entity_code == "GPS "){
            GlobalPositionSensorCapabilityType    gps_cap;
        }else if(position_entity_code == "NGPS"){
            PositionSensorCapabilityType    pos_cap;
        } else if(position_entity_code == "ALTI"){
            AltitudeSensorCapabilityType    alt_cap;
        }
    }
}
```

```
class PositionMetadataEntity(unsigned int(32) position_entity_code, unsigned int(8)  entity_encoding
= 0)
{
    if(entity_encoding == 0) { //binary encoding
        if(position_entity_code == "GPS "){
            GlobalPositionSensorType              global_position;
        }else if(position_entity_code == "nGPS"){
            PositionSensorType                    position;
        } else if(position_entity_code == "ALTI"){
            AltitudeSensorType                    altitude;
        }
    }
}
```

FIG. 18

```
aligned(8) class TrackReferenceBox extends Box('tref') {
}
aligned(8) class TrackReferenceTypeBox (unsigned int(32) reference_type) extends
Box(reference_type) {
            unsigned int(32) track_IDs[];
}
``` track_ID is an integer that provides a reference from the containing track to another track in the presentation. track_IDs are never re-used and cannot be equal to zero.
The reference_type can be set to one of the following values, or a value registered or from a derived specification or registration:
•'hint' - the referenced track(s) contain the original media for this hint track.
•'cdsc' - this track describes the referenced track. (this track contains timed metadata for referenced track)
•'font' - this track uses fonts carried/defined in the referenced track.
•'hind' - this track depends on the referenced hint track, i.e., it should only be used if the referenced hint track is used.
•'vdep' - this track contains auxiliary depth video information for the referenced video track.
•'vplx' - this track contains auxiliary parallax video information for the referenced video track.
•'subt' - this track contains subtitle, timed text or overlay graphical information for the referenced track or any track in the alternate group to which the track belongs, if any.
-'pmet' - this track contains position information for the referenced track

FIG. 19

| Syntax | No. bits | Mnemonic |
|---|---|---|
| position_access_unit() { | | |
|   entity_count | 8 | uimsbf |
|   for ( i = 0; i < entity_count; i++) { | | |
|     entity_size_bytes    /*N*/ | 8 | uimsbf |
|     entity_encoding | 8 | uimsbf |
|     sensor_capability_included | 1 | bslbf |
|     position_entity_code | 32 | uimsbf |
|     if(sensor_capability_included == '1') { | | |
|       position_sensor_capability_len  /*CL*/ | 8 | uimsbf |
|       if(position_entity_code == "GPS"){ | | |
|         gps_cap | CL*8 | uimsbf |
|       }else if(position_entity_code == "NGPS"){ | | |
|         pos_cap | CL*8 | uimsbf |
|       } else if(position_entity_code == "ALTI"){ | | |
|         alt_cap | CL*8 | uimsbf |
|       } | | |
|     } | | |
|     '0010' | 4 | bslbf |
|     media_DTS [32..30] | 8 | uimsbf |
|     marker_bit | 1 | bslbf |
|     media_DTS [29..15] | 15 | uimsbf |
|     marker_bit | 1 | bslbf |
|     media_DTS [14..0] | 15 | uimsbf |
|     marker_bit | 1 | bslbf |
|     '0010' | 4 | bslbf |
|     display_in_PTS [32..30] | 3 | uimsbf |
|     marker_bit | 1 | bslbf |
|     display_in_PTS [29..15] | 16 | uimsbf |
|     marker_bit | 1 | bslbf |
|     display_in_PTS [14..0] | 15 | uimsbf |
|     marker_bit | 1 | bslbf |
|     if(position_entity_code == "GPS"){ | | |
|       global_position | (N-CL)*8 | uimsbf |
|       }else if(position_entity_code == "nGPS"){ | | |
|       position | (N-CL)*8 | uimsbf |
|       } else if(position_entity_code == "ALTI"){ | | |
|       altitude | (N-CL)*8 | uimsbf |
|       } | | |
|     } | | |
|   } | | |
| } | | |

FIG. 20

| Syntax | No. Bits | Mnemonic |
|---|---|---|
| position_access_unit_section (){ | | |
|     table_ID | 8 | uimsbf |
|     section_syntax_indicator | 1 | bslbf |
|     private_indicator | 1 | bslbf |
|     reserved | 2 | bslbf |
|     private_section_length | 12 | uimsbf |
|     position_access_unit() | | |
|     CRC_32 | 32 | rpchof |
| } | | |
| } | | |

FIG. 21

| Syntax | No. Bits | Mnemonic |
|---|---|---|
| TS_program_map_section() { | | |
|     table_id | 8 | uimsbf |
|     section_syntax_indicator | 1 | bslbf |
|     '0' | 1 | bslbf |
|     reserved | 2 | bslbf |
|     section_length | 12 | uimsbf |
|     program_number | 16 | uimsbf |
|     reserved | 2 | bslbf |
|     version_number | 5 | uimsbf |
|     current_next_indicator | 1 | bslbf |
|     section_number | 8 | uimsbf |
|     last_section_number | 8 | uimsbf |
|     reserved | 3 | bslbf |
|     PCR_PID | 13 | uimsbf |
|     reserved | 4 | bslbf |
|     program_info_length | 12 | uimsbf |
|     for (i = 0; i<N; i++) { | | |
|         descriptor() | | |
|     } | | |
|     for (i = 0; i<N1; i++) { | | |
|         stream_type | 8 | uimsbf |
|         reserved | 3 | bslbf |
|         elementary_PID | 13 | uimsbf |
|         reserved | 4 | bslbf |
|         ES_info_length | 12 | uimsbf |
|         for (i = 0; i <N2; i++) { | | |
|             descriptor() | | |
|         } | | |
|     } | | |
|     CRC_32 | 32 | rpchof |
| } | | |

FIG. 22

| Syntax | No. bits | Mnemonic |
|---|---|---|
| Position_extension_descriptor() { | | |
|   entity_count | 8 | uimsbf |
|   for ( i = 0; i < entity_count; i++) { | | |
|     entity_size_bytes  /*N*/ | 16 | uimsbf |
|     entity_encoding | 7 | uimsbf |
|     sensor_capability_included | 1 | bslbf |
|     position_entity_code | 32 | uimsbf |
|     if(sensor_capability_included == '1') { | | |
|       position_sensor_capability_len  /*CL*/ | 8 | uimsbf |
|       if(position_entity_code == "GPS"){ | | |
|         gps_cap | CL*8 | uimsbf |
|       }else if(position_entity_code == "NGPS"){ | | |
|         pos_cap | CL*8 | uimsbf |
|       } else if(position_entity_code == "ALTI"){ | | |
|         alt_cap | CL*8 | uimsbf |
|       } | | |
|     } | | |
|   } | | |
| } | | |

FIG. 23

| Syntax | No. of bits | Mnemonic |
|---|---|---|
| Extension_descriptor () { | | |
|     descriptor_tag | 8 | uimsbf |
|     descriptor_length | 8 | uimsbf |
|     descriptor_length | 8 | uimsbf |
|     if ( extension_descriptor_tag == 0x02) { | | |
|         ObjectDescriptorUpdate() | | |
|     } else if ( extension_descriptor_tag == 0x03) { | | |
|         HEVC_timing_and_HRD_descriptor() | | |
|     } else if ( extension_descriptor_tag == 0x04) { | | |
|         af_extension_descriptor() | | |
|     } else if ( extension_descriptor_tag == 0x05) { | | |
|         HEVC_operation_point_descriptor() | | |
|     } else if ( extension_descriptor_tag == 0x06) { | | |
|         HEVC_hierachy_extension_descriptor() | | |
|     } else if ( extension_descriptor_tag == 0x07) { | | |
|         Green_extension_descriptor () | | |
|     } else if ( extension_descriptor_tag == 0x08) { | | |
|         Quality_extension_descriptor () | | |
|     } else if ( extension_descriptor_tag == 0x10) { | | |
|         Position_extension_descriptor () | | |
|     } else { | | |
|         for ( i=0; i<N; i++ ) { | | |
|             reserved | 8 | bslbf |
|         } | | |
|     } | | |
| } | | |

| Extension_descriptor_tag | TS | PS | Identification |
|---|---|---|---|
| 0 | n/a | n/a | Reserved |
| 1 | n/a | X | Forbidden |
| 2 | X | X | ODUpdate descriptor |
| 3 | X | n/a | HEVC_timing_and_HRD_descriptor() |
| 4 | | | af_extensions_descriptor() |
| 5 | X | n/a | HEVC_operation_point_descriptor() |
| 6 | X | n/a | HEVC_hierarchy_extension_descriptor() |
| 7 | X | n/a | Green_extension_descriptor() |
| 8 | X | n/a | Quality_extension_descriptor() |
| 10 | X | n/a | Position_extension_descriptor() |
| 10-255 | n/a | n/a | Rec. ITU-T H.222.0 | ISO/IEC 13818-1 Reserved |

FIG. 24

| OrientationSensorCapabilityType { | (Number of bits) | (Mnemonic) |
|---|---|---|
| SensorCapabilityBase | | SensorCapabilityBaseType |
| OrientationRange | | OrientationRangeType |
| } | | |
| OrientationRangeType { | | |
| YawMin | 32 | fsbf |
| YawMax | 32 | fsbf |
| PitchMin | 32 | fsbf |
| PitchMax | 32 | fsbf |
| RollMin | 32 | fsbf |
| RollMax | 32 | fsbf |
| } | | |

| Name | Definition |
|---|---|
| OrientationRange | Describes the range that the orientation sensor can perceive in terms of OrientationRangeType |
| OrientationRangeType | Defines the range from the local coordinate system according to the Yaw, Pitch and Roll. |
| YawMin | Describes the minimum value that the orientation sensor can perceive for Yaw in the unit of degree. |
| YawMax | Describes the maximum value that the orientation sensor can perceive for Yaw in the unit of degree. |
| PitchMin | Describes the minimum value that the orientation sensor can perceive for Pitch in the unit of degree. |
| PitchMax | Describes the maximum value that the orientation sensor can perceive for Pitch in the unit of degree. |
| RollMin | Describes the minimum value that the orientation sensor can perceive for Roll in the unit of degree. |
| RollMax | Describes the maximum value that the orientation sensor can perceive for Roll in the unit of degree. |

FIG. 25

| OrientationSensorType { | Number of bits | Mnemonic |
|---|---|---|
| UpdateMode | 1 | bslbf |
| if(UpdateMode ==0){ | | |
|    OrientationSensorNormal | | OrientationSensorNormalType |
| }else{ | | |
|    OrientationSensorUpdate | | OrientationSensorUpdateType |
| } | | |
| } | | |

| UpdateMode | This field signals whether the sensed information is on the normal mode or on the update mode. A value of "1" means the update mode is used and "0" means the normal mode is used. |
|---|---|

| OrientationSensorType { | Number of bits | Mnemonic |
|---|---|---|
|    orientationFlag | 1 | bslbf |
|    unitFlag | 1 | bslbf |
|    SensedInfoBaseType | | SensedInfoBaseTypeType |
|    if(orientationFlag) { | | |
|      orientation | | Float3DVectorType |
|    } | | |
|    if(unitFlag) { | | |
|      unit | | unitType |
|    } | | |
| } | | |

| Orientation | Describes the sensed value by the orientation sensor in three dimensional vector in the unit of degree. The orientation is measured as the inclined degree (orientation) with respect to the original pose. The original pose is the pose of the object sensed at the time of sensor activation. If a calibration has been performed on the orientation of the sensor after activation, the orientation after the calibration is considered as the original pose of the object. |
|---|---|
| unit | Specifies the unit of the sensed value, if a unit other than the default unit is used |

FIG. 26

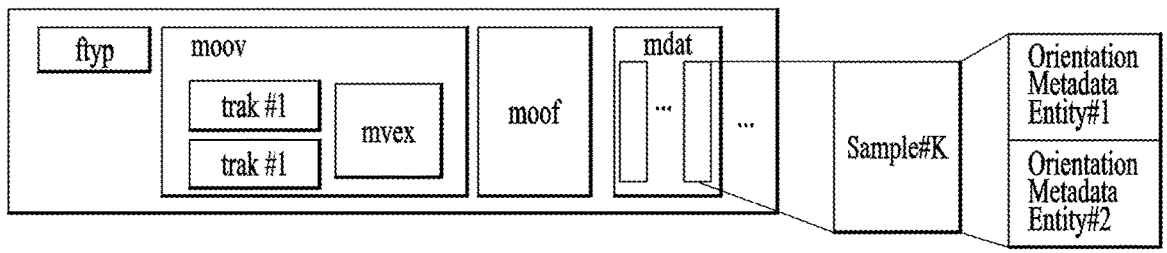

FIG. 27

```
aligned(8) class OrientationMetadataSampleEntry() extends MetadataSampleEntry ('omse') {
    OrientationMetadataConfigurationBox();
}
```

```
aligned(8) class OrientationMetadataConfigurationBox extends FullBox('omcb', version=0, 0)
{
    unsigned    int(8)          entity_count;
    for(int i=1; i<= entity_count; i++) {
        unsigned int(16)        entity_size_bytes;
        unsigned int(7)         entity_encoding;
        unsigned int(1)         sensor_capability_included;
        unsigned int(32)        orientation_entity_code;
        if(entity_encoding == 0x01) {   //XML format
            string      content_encoding; // optional
            string      namespace;
            string      schema_location; // optional
            BitRateBox (); // optional
        }
        if(sensor_capability_included == '1') {
            OrientationSensorCapability(orientation_entity_code, entity_encoding);
        }
    }
}
```

FIG. 28

```
aligned(8) class OrientationMetadataSample() {
    for(int i=1; i<= entity_count; i++) {
        if(sensor_capability_included == '1') {
            OrientionSensorCapability(orientation_entity_code, entity_encoding);
        }
        OrientationMetadataEntity(orientation_entity_code, entity_encoding);
    }
}
```

```
class OrientationSensorCapability(unsigned int(32) orientation_entity_code, unsigned int(8)
entity_encoding = 0)
{
    if(entity_encoding == 0) { //binary encoding
        unsinged int(8) cap_size_bytes;
        if(orientation_entity_code == "ORIN "){ // when orientation information is included
            OrientationSensorCapabilityType  orin_cap;
        }
    }
}
```

```
class OrientationMetadataEntity(unsigned int(32) orientation_entity_code, unsigned int(8)
entity_encoding = 0)
{
    if(entity_encoding == 0) { //binary encoding
        if(orientation_entity_code == "ORIN"){
            OrientationSensorType  orientation;
        }
    }
}
```

FIG. 29

```
aligned(8) class TrackReferenceBox extends Box('tref') {
}
aligned(8) class TrackReferenceTypeBox (unsigned int(32) reference_type) extends
Box(reference_type) {
          unsigned int(32) track_IDs[];
}
``` track_ID is an integer that provides a reference from the containing track to another track in the presentation. track_IDs are never re-used and cannot be equal to zero.
The reference_type can be set to one of the following values, or a value registered or from a derived specification or registration:
•'hint' - the referenced track(s) contain the original media for this hint track.
•'cdsc' - this track describes the referenced track. (this track contains timed metadata for referenced track)
•'font' - this track uses fonts carried/defined in the referenced track.
•'hind' - this track depends on the referenced hint track, i.e., it should only be used if the referenced hint track is used.
•'vdep' - this track contains auxiliary depth video information for the referenced video track.
•'vplx' - this track contains auxiliary parallax video information for the referenced video track.
•'subt' - this track contains subtitle, timed text or overlay graphical information for the referenced track or any track in the alternate group to which the track belongs, if any.
-'omet' - this track contains orientation information for the referenced track

FIG. 30

| Syntax | No. bits | Mnemonic |
|---|---|---|
| orientation_access_unit() { | | |
|    entity_count | 8 | uimsbf |
|    for ( i = 0; i < entity_count; i++) { | | |
|       entity_size_bytes   /*N*/ | 16 | uimsbf |
|       entity_encoding | 7 | uimsbf |
|       sensor_capability_included | 1 | bslbf |
|       orientation_entity_code | 32 | uimsbf |
|       if(sensor_capability_included == '1') { | | |
|          orientation_sensor_capability_len  /*CL*/ | 8 | uimsbf |
|          if(orientation_entity_code == "ORIN"){ | | |
|             orin_cap | | |
|          } | CL*8 | uimsbf |
|       } | | |
|       '0010' | | |
|       media_DTS [32..30] | 4 | bslbf |
|       marker_bit | 3 | uimsbf |
|       media_DTS [29..15] | 1 | bslbf |
|       marker_bit | 15 | uimsbf |
|       media_DTS [14..0] | 1 | bslbf |
|       marker_bit | 15 | uimsbf |
|       '0010' | 1 | bslbf |
|       display_in_PTS [32..30] | 4 | bslbf |
|       marker_bit | 3 | uimsbf |
|       display_in_PTS [29..15] | 1 | bslbf |
|       marker_bit | 15 | uimsbf |
|       display_in_PTS [14..0] | 1 | bslbf |
|       marker_bit | 15 | uimsbf |
|       if(orientation_entity_code == "ORIN"){ | 1 | bslbf |
|          orientation | | |
|       } | (N-CL)*8 | uimsbf |
|    } | | |
| } | | |

FIG. 31

| Syntax | No. Bits | Mnemonic |
|---|---|---|
| orientation_access_unit_section (){ | | |
|     table_ID | 8 | uimsbf |
|     section_syntax_indicator | 1 | bslbf |
|     private_indicator | 1 | bslbf |
|     reserved | 2 | bslbf |
|     private_section_length | 12 | uimsbf |
|     orientation_access_unit() | | |
|     CRC_32 | 32 | rpchof |
| } | | |
| } | | |

FIG. 32

| Syntax | No. bits | Mnemonic |
|---|---|---|
| Orientation_extension_descriptor() { | | |
|   entity_count | 8 | uimsbf |
|   for ( i = 0; i < entity_count; i++) { | | |
|     entity_size_bytes  /*N*/ | 16 | uimsbf |
|     entity_encoding | 7 | uimsbf |
|     sensor_capability_included | 1 | bslbf |
|     orientation_entity_code | 32 | uimsbf |
|     if(sensor_capability_included == '1') { | | |
|       orientation_sensor_capability_len /*CL*/ | 8 | uimsbf |
| if(orientation_entity_code == "ORIN"){ | | |
|   orin_cap | CL*8 | uimsbf |
| } | | |
| } | | |

FIG. 33

| Syntax | No. Bits | Mnemonic |
|---|---|---|
| Extension_descriptor () { | 8 | uimsbf |
|   descriptor_tag | 8 | uimsbf |
|   descriptor_length | 8 | uimsbf |
|   extension_descriptor_tag | | |
|   if ( extension_descriptor_tag == 0x02) { | | |
|     ObjectDescriptorUpdate() | | |
|   } else if ( extension_descriptor_tag == 0x03) { | | |
|     HEVC_timing_and_HRD_descriptor() | | |
|   } else if ( extension_descriptor_tag == 0x04) { | | |
|     af_extension_descriptor() | | |
|   } else if ( extension_descriptor_tag == 0x05) { | | |
|     HEVC_operation_point_descriptor() | | |
|   } else if ( extension_descriptor_tag == 0x06) { | | |
|     HEVC_hierachy_extension_descriptor() | | |
|   } else if ( extension_descriptor_tag == 0x07) { | | |
|     Green_extension_descriptor () | | |
|   } else if ( extension_descriptor_tag == 0x08) { | | |
|     Quality_extension_descriptor () | | |
|   } else if ( extension_descriptor_tag == 0x0A) { | | |
|     Position_extension_descriptor () | | |
|   } else if (extension_descriptor_tag == 0x0B) { | | |
|     Orientation_extension_descriptor () | | |
|   } | | |
|   for ( i=0; i<N; i++ ) { | | |
|     reserved | 8 | bslbf |
|   } | | |
| } | | |

| Extension_descriptor_tag | TS | PS | Identification |
|---|---|---|---|
| 0 | n/a | n/a | Reserved |
| 1 | n/a | X | Forbidden |
| 2 | X | X | ODUpdate_descriptor |
| 3 | X | n/a | HEVC_timing_and_HRD_descriptor() |
| 4 | | | af_extensions_descriptor() |
| 5 | X | n/a | HEVC_operation_point_descriptor() |
| 6 | X | n/a | HEVC_operation_point_descriptor() |
| 7 | X | n/a | HEVC_hierachy_extension_descriptor() |
| 8 | X | n/a | Quality_extension_descriptor() |
| 10 | X | n/a | Position_extension_descriptor() |
| 11 | X | n/a | Orientation_extension_descriptor() |
| 10-255 | n/a | n/a | Rec. ITU-T H.222.0 | ISO/IEC 13818-1 Reserved |

BROADCAST SIGNAL TRANSMISSION DEVICE, BROADCAST SIGNAL RECEPTION DEVICE, BROADCAST SIGNAL TRANSMISSION METHOD, AND BROADCAST SIGNAL RECEPTION METHOD

CROSS-REFERENCE TO RELATED APPLICATIONS

This application is a National Stage application under 35 U.S.C. § 371 of International Application No. PCT/KR2017/005182, filed on May 18, 2017, which claims the benefit of U.S. Provisional Application No. 62/339,101, filed on May 20, 2016. The disclosures of the prior applications are incorporated by reference in their entirety.

TECHNICAL FIELD

The present invention relates to a broadcast signal transmission device, a broadcast signal reception device, a broadcast transmission method, and a broadcast reception method. More particularly, the present invention relates to a broadcast signal transmission device, a broadcast signal reception device, a broadcast signal transmission method, and a broadcast signal reception method for providing a next generation media service including immersive contents.

BACKGROUND ART

In accordance with the end of analog broadcast signal transmission, various technologies for transmitting and receiving a digital broadcast signal are developing. A digital broadcast signal can include an amount of video/audio data greater than that of an analog broadcast signal. In addition to the video/audio data, the digital broadcast signal can further include a variety of additional data. And, a recent broadcast system can include contents/services capable of providing a user with various and realistic experiences.

DISCLOSURE OF THE INVENTION

Technical Tasks

A digital broadcast system can provide a user with HD (High Definition) images, multi-channel audio, and various additional services. However, in order to perform digital broadcasting, it is necessary to improve network flexibility in consideration of a data transfer rate for the great amount of data transmission, robustness of Tx/Rx network, and a mobile reception device.

One or more devices can obtain various contents and consume the various contents. When the one or more devices consume the various contents, it is able to provide a user with immersive contents via media orchestration in a time/spatial form. It is required to have system architecture and a signaling method for providing the immersive contents to a user.

Technical Solution

The present invention proposes a broadcast signal transmission device, a broadcast signal reception device, a broadcast signal transmission method, and a broadcast signal reception method for providing a next generation media service including immersive contents according to the objective of the present invention.

Specifically, in order to provide an immersive content service, a method of transmitting and signaling a position metadata of a source/sink related to a video/audio stream is disclosed.

And, a method of defining an access unit of a position metadata of a source/sink associated with a video/audio track (stream) and a method of configuring a metadata stream are disclosed.

And, a method of storing a position metadata stream of a source/sink associated with a video/audio track (stream) in a file format such as ISO BMFF and a method of signaling the position metadata stream are disclosed.

And, a method of multiplexing a position metadata stream of a source/sink associated with a video/audio track (stream) in MPEG-2 TS and a method of signaling the position metadata stream are disclosed.

And, in order to provide an immersive content service, a method of transmitting and signaling an orientation metadata of a source/sink related to a video/audio stream is disclosed.

And, a method of defining an access unit of an orientation metadata of a source/sink associated with a video/audio track (stream) and a method of configuring a metadata stream are disclosed.

And, a method of storing an orientation metadata stream of a source/sink associated with a video/audio track (stream) in a file format such as ISO BMFF and a method of signaling the orientation metadata stream are disclosed.

And, a method of multiplexing an orientation metadata stream of a source/sink associated with a video/audio track (stream) in MPEG-2 TS and a method of signaling the orientation metadata stream are disclosed.

Advantageous Effects

According to the present invention, it is able to provide a user with contents/services capable of providing various and realistic experiences to the user.

According to one embodiment of the present invention, since a video is captured via one or more moving cameras and information on the captured video and information on a movement of a camera such as a position of the camera or orientation of the camera are provided, a reception side can dynamically consume one or more contents.

DESCRIPTION OF DRAWINGS

FIG. 5 illustrates an embodiment of global position sensor capability including detail information on capability of a global positioning system (GPS);

FIG. 6 illustrates an embodiment of position sensor capability including detail information on capability of a position sensor;

FIG. 7 illustrates an embodiment of altitude sensor capability including detail information on capability of an altitude sensor;

FIGS. 8 and 9 illustrate a sensor capability base type according to one embodiment of the present invention;

FIG. 10 illustrates an embodiment of global position data obtained from a global positioning system (GPS) sensor;

FIG. 11 illustrates an embodiment of altitude data obtained from an altitude sensor;

FIG. 12 illustrates an embodiment of position data obtained from a position sensor;

FIG. 13 illustrates SensedInfoBaseType according to one embodiment of the present invention;

FIG. 14 is a diagram illustrating an ISOBMFF file including position metadata according to one embodiment of the present invention;

FIG. 15 is a diagram illustrating PositionMetadataSampleEntry( ) according to one embodiment of the present invention;

FIG. 16 is a diagram illustrating codec_specific_parameters of SubSampleInformationBox for a metadata entity;

FIG. 17 is a diagram illustrating a position metadata sample according to one embodiment of the present invention;

FIG. 18 is a diagram illustrating reference types for a tref box and a position metadata track according to one embodiment of the present invention;

FIG. 19 is a diagram illustrating a position access unit including position metadata according to one embodiment of the present invention;

FIG. 20 is a diagram illustrating an MPEG-2 private section according to one embodiment of the present invention;

FIG. 21 is a diagram illustrating PMT according to one embodiment of the present invention;

FIG. 22 is a diagram illustrating a position metadata descriptor according to one embodiment of the present invention;

FIG. 23 is a diagram illustrating a shape of a position metadata descriptor transmitted in an extension_descriptor form of MPEG-2 according to one embodiment of the present invention;

FIG. 24 illustrates an embodiment of orientation sensor capability including detail information on capability of an orientation sensor;

FIG. 25 illustrates an embodiment of orientation data obtained from an orientation sensor;

FIG. 26 is a diagram illustrating an ISOBMFF file including orientation metadata according to one embodiment of the present invention;

FIG. 27 is a diagram illustrating OrientationMetadataSampleEntry( ) according to one embodiment of the present invention;

FIG. 28 is a diagram illustrating an orientation metadata sample according to one embodiment of the present invention;

FIG. 29 is a diagram illustrating reference types for a tref box and an orientation metadata track according to one embodiment of the present invention;

FIG. 30 is a diagram illustrating an orientation access unit including orientation metadata according to one embodiment of the present invention;

FIG. 31 is a diagram illustrating MPEG-2 private section according to one embodiment of the present invention;

FIG. 32 is a diagram illustrating an orientation metadata descriptor according to one embodiment of the present invention;

FIG. 33 is a diagram illustrating a shape of an orientation metadata descriptor transmitted in an extension_descriptor form of MPEG-2 according to one embodiment of the present invention;

BEST MODE

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

Although most terms used in the present invention have been selected from general ones widely used in the art, some terms have been arbitrarily selected by the applicant and their meanings are explained in detail in the following description as needed. Thus, the present invention should be understood according to the intended meanings of the terms rather than their simple names or meanings.

Figure 1:
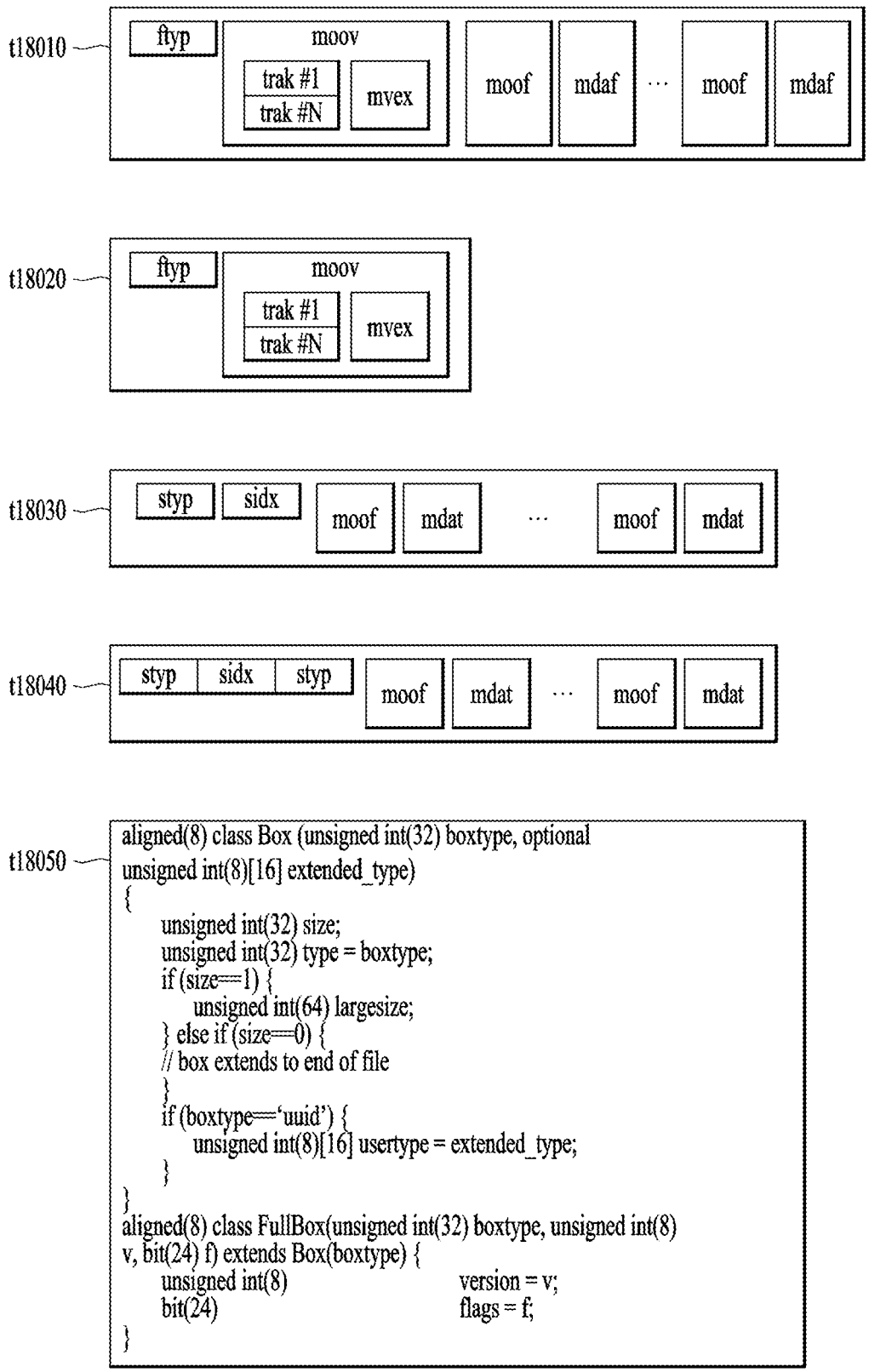
FIG. 1 is a diagram illustrating a structure of a media file according to one embodiment of the present invention.

FIG. 1 is a diagram illustrating a structure of a media file according to one embodiment of the present invention.

Figure 2:
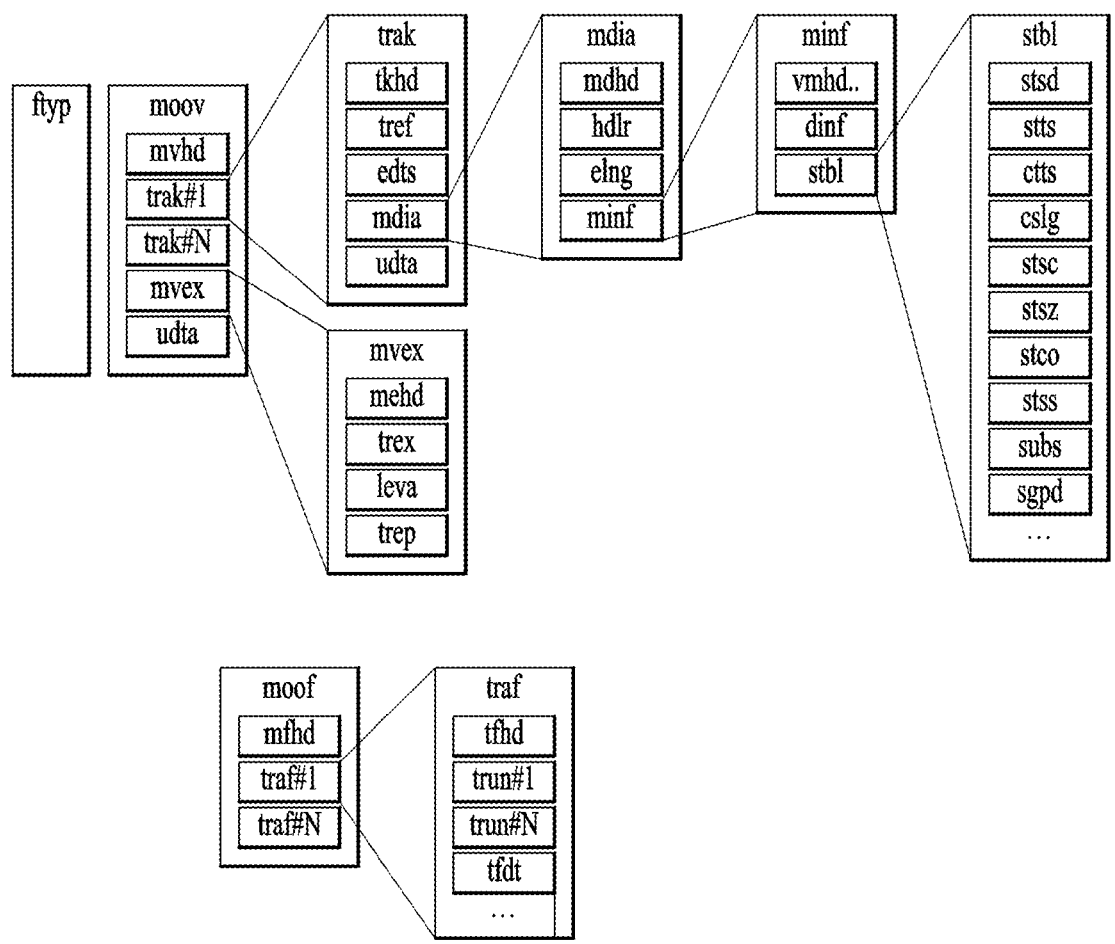
FIG. 2 is a diagram illustrating a hierarchical structure of boxes in ISOBMFF according to one embodiment of the present invention.

FIG. 2 is a diagram illustrating a hierarchical structure of boxes in ISOBMFF according to one embodiment of the present invention.

A standardized media file format may be defined to store and transmit media data, such as audio or video. In some embodiments, the media file may have a file format based on ISO base media file format (ISO BMFF).

The media file according to the present invention may include at least one box. Here, the term "box" may be a data block or object including media data or metadata related to the media data. Boxes may have a hierarchical structure, based on which data are sorted such that the media file has a form suitable for storing and/or transmitting large-capacity media data. In addition, the media file may have a structure enabling a user to easily access media information, e.g. enabling the user to move to a specific point in media content.

The media file according to the present invention may include an ftyp box, an moov box, and/or an mdat box.

The ftyp box (file type box) may provide the file type of the media file or information related to the compatibility thereof. The ftyp box may include configuration version information about media data of the media file. A decoder may sort the media file with reference to the ftyp box.

The moov box (movie box) may be a box including metadata about media data of the media file. The moov box may serve as a container for all metadata. The moov box may be the uppermost-level one of the metadata-related boxes. In some embodiments, only one moov box may exist in the media file.

The mdat box (media data box) may be a box containing actual media data of the media file. The media data may include audio samples and/or video samples. The mdat box may serve as a container containing such media samples.

In some embodiments, the moov box may further include an mvhd box, a trak box, and/or an mvex box as lower boxes.

The mvhd box (movie header box) may include information related to media presentation of media data included in the media file. That is, the mvhd box may include information, such as a media production time, change time, time standard, and period of the media presentation.

The trak box (track box) may provide information related to a track of the media data. The trak box may include information, such as stream-related information, presentation-related information, and access-related information about an audio track or a video track. A plurality of trak boxes may exist depending on the number of tracks.

In some embodiments, the trak box may further include a tkhd box (track heater box) as a lower box. The tkhd box may include information about the track indicated by the trak box. The tkhd box may include information, such as production time, change time, and identifier of the track.

The mvex box (move extended box) may indicate that a moof box, a description of which will follow, may be included in the media file. moof boxes may be scanned in order to know all media samples of a specific track.

In some embodiments, the media file according to the present invention may be divided into a plurality of fragments (t18010). As a result, the media file may be stored or transmitted in the state of being divided. Media data (mdat box) of the media file may be divided into a plurality of fragments, and each fragment may include one moof box and one divided part of the mdat box. In some embodiments, information of the ftyp box and/or the moov box may be needed in order to utilize the fragments.

The moof box (movie fragment box) may provide metadata about media data of the fragment. The moof box may be the uppermost-level one of the metadata-related boxes of the fragment.

The mdat box (media data box) may include actual media data, as previously described. The mdat box may include media samples of the media data corresponding to the fragment.

In some embodiments, the moof box may further include an mfhd box and/or a traf box as lower boxes.

The mfhd box (movie fragment header box) may include information related to correlation between the divided fragments. The mfhd box may indicate the sequence number of the media data of the fragment. In addition, it is possible to check whether there are omitted parts of the divided data using the mfhd box.

The traf box (track fragment box) may include information about the track fragment. The traf box may provide metadata related to the divided track fragment included in the fragment. The traf box may provide metadata in order to decode/reproduce media samples in the track fragment. A plurality of traf boxes may exist depending on the number of track fragments.

In some embodiments, the traf box may further include a tfhd box and/or a trun box as lower boxes.

The tfhd box (track fragment header box) may include header information of the track fragment. The tfhd box may provide information, such as a basic sample size, period, offset, and identifier, for media samples of the track fragment indicated by the traf box.

The trun box (track fragment run box) may include information related to the track fragment. The trun box may include information, such as a period, size, and reproduction start time for each media sample.

The media file or the fragments of the media file may be processed and transmitted as segments. The segments may include an initialization segment and/or a media segment.

The file of the embodiment shown (t18020) may be a file including information related to initialization of a media decoder, excluding a media file. For example, this file may correspond to the initialization segment. The initialization segment may include the ftyp box and/or the moov box.

The file of the embodiment shown (t18030) may be a file including the fragment. For example, this file may correspond to the media segment. The media segment may include the moof box and/or the mdat box. In addition, the media segment may further include an styp box and/or an sidx box.

The styp box (segment type box) may provide information for identifying media data of the divided fragment. The styp box may perform the same function as the ftyp box for the divided fragment. In some embodiments, the styp box may have the same format as the ftyp box.

The sidx box (segment index box) may provide information indicating the index for the divided fragment, through which it is possible to indicate the sequence number of the divided fragment.

In some embodiments (t18040), an ssix box may be further included. In the case in which the segment is divided into sub-segments, the ssix box (sub-segment index box) may provide information indicating the index of the sub-segment.

The boxes in the media file may include further extended information based on the form of a box shown in the embodiment (t18050) or FullBox. In this embodiment, a size field and a largesize field may indicate the length of the box in byte units. A version field may indicate the version of the box format. A type field may indicate the type or identifier of the box. A flags field may indicate a flag related to the box.

In the following, system architecture for providing a user with immersive contents and a signaling method are explained.

Figure 3:
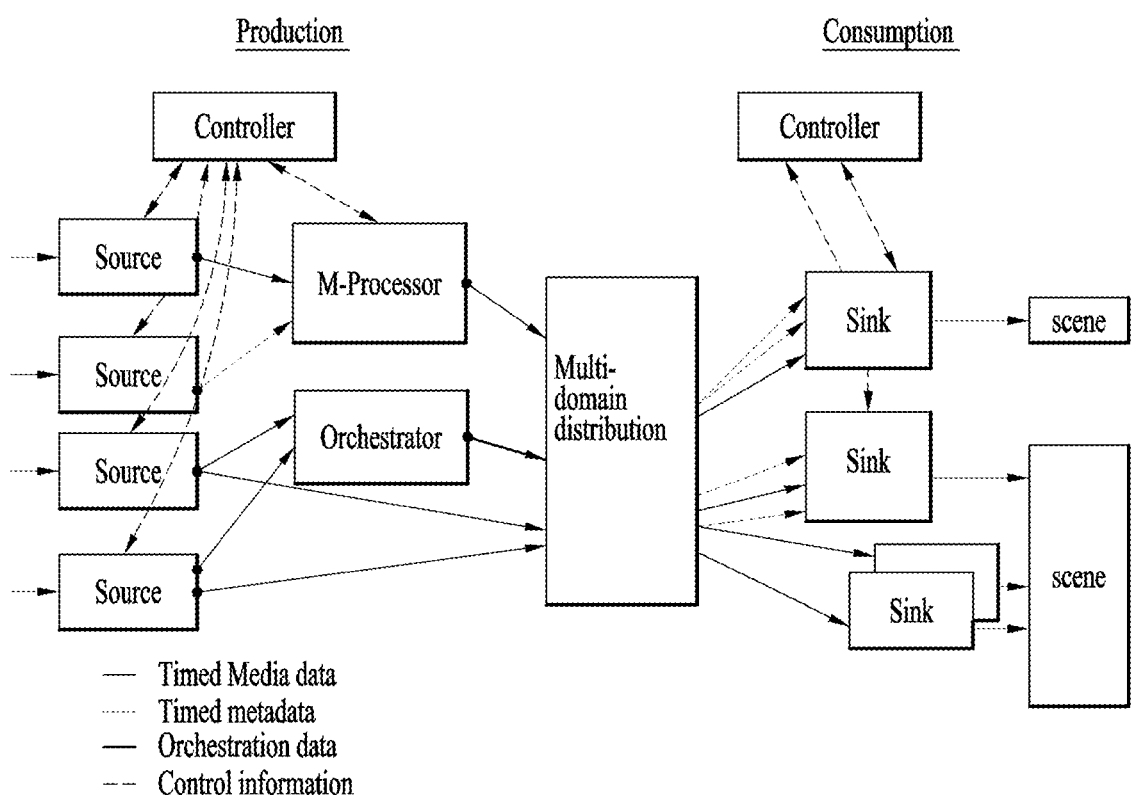
FIG. 3 is a diagram illustrating system architecture for providing immersive contents according to one embodiment of the present invention.

FIG. 3 is a diagram illustrating system architecture for providing immersive contents according to one embodiment of the present invention.

Referring to FIG. 3, a functional configuration of a system for providing immersive contents according to one embodiment of the present invention is illustrated. The system for providing immersive contents according to one embodiment of the present invention includes a production unit and a consumption unit. The production part corresponds to a part that produces, manufactures, or obtains contents and/or metadata. The consumption part may correspond to a part that consumes, uses, or plays the contents and/or the metadata produced, manufactured, or obtained by the production part. Meanwhile, the production part can produce, manufacture, or obtain the contents and/or the metadata via one or more devices. Similarly, the consumption part can consume, use, or play the contents and/or the metadata via one or more devices.

One or more devices can obtain various contents and/or metadata and one or more devices can consume the various contents and/or the metadata. If the one or more devices consume the various contents, as mentioned in the foregoing description, it is able to provide a user with immersive contents via media orchestration in a time/spatial form.

The media orchestration orchestrates capturing, presenting, and processing of media and metadata associated with various devices.

The orchestration for media capturing relates to metadata and control indicating a device to capture, media to be captured, timing of capturing, and a method of capturing. In this case, the media to be captured indicates a captured media and a part of the media to be captured. The timing of capturing indicates not only the start of capturing and the stop of capturing, but also capture synchronization with a different device(s). The method of capturing indicates a used codec, forwarded metadata, and applicable processing. Moreover, the method of capturing can indicate a position, orientation, capture capabilities, a frame rate, resolution, microphone gain, white balance settings, etc.

The orchestration for media presentation relates to metadata and control indicating a device to make a presentation, media to be presented, timing of presentation, and a method making a presentation. In this case, the media to be presented indicates a media to be searched and a part of media to be presented. The timing of presentation indicates presentation synchronization with a different device(s). The method of making a presentation indicates a location where a presentation target is to be accurately played. For example, the position may correspond to a position of a media part on a screen, a position of an audio object within a space, and applicable processing.

The orchestration for processing relates to metadata and control for processing a captured media and/or a combination of metadata. The processing includes not only single-media processing (e.g., in case of transcoding, media synchronization) but also processing of multiple media and/or metadata together (e.g., video stitching, changing video array within time/space, or automated editing and selecting process).

A system for providing immersive contents according to one embodiment of the present invention can include a source, a sink, an orchestrator, an M-processor, and a controller.

The source may correspond to an element or a configuration that obtains and/or transmits media data and/or metadata. According to one embodiment of the present invention, the source can capture such a media data as a video data and can generate or obtain metadata related to the video data. And, the source can transmit the captured video data and the received or generated metadata to a different element. In this case, the different element may correspond to the orchestrator, the M-processor, or the sink which is to be described later. According to one embodiment, the metadata may correspond to a timed metadata.

The source can receive control information. According to one embodiment, the source can receive control information from the controller which is to be described later.

The sink may correspond to an element receiving media and/or metadata. And, the sink can present received media data.

And, the sink can receive orchestration data and/or metadata.

The orchestrator may correspond to an element receiving media data and/or metadata. And, the orchestrator can output orchestration data. According to one embodiment, the orchestrator generates orchestration data indicating information on a relationship between media data and metadata and may be then able to output the generated orchestration data. The outputted orchestration date can be forwarded to the consumption part through such a medium as multi-domain distribution illustrated in the drawing. According to one embodiment, the multi-domain distribution can be included in a transmission network such as a broadcast network/Internet network. According to one embodiment, the orchestrator can be implemented by the M-processor which is to be described later. According to the embodiment, the M-processor can generate orchestration data from media data, metadata, and/or other orchestration data.

The M-processor may correspond to an element processing media data and/or metadata. The M-processor can receive media data and/or metadata or orchestration data. And, the M-processor can output new media data and/or metadata using the received media data and/or metadata. The M-processor and the source can be positioned at the same device or the M-processor can be separately positioned irrespective of the source. When the orchestrator is implemented by the M-processor, if the M-processor is positioned at the same device, orchestration data can be generated in the device as well.

The controller may correspond to an element controlling one or more different elements. In particular, the controller can control all or a part of the abovementioned elements. To this end, the controller can output or receive a control signal or control data. Meanwhile, the controller may not have a defined input interface.

Meanwhile, an application server can include a controller function and an M-processing function. The M-processing function can include transcoding, adding or changing a timeline, multiplexing, de-multiplexing, selecting (editing), stitching, tiling (e.g., MPEG DASH Relationship Description), translation, metadata stream extraction (e.g., CDVS metadata), and the like.

According to one embodiment, each of the source and the sink may correspond to a single device.

According to a different embodiment, a device may have both a source function and a sunk function.

According to a further different embodiment, a device can include all or a part of the controller, the M-processor, and the orchestrator and the device may have one or more sources.

And, a device may correspond to a physical entity capable of implementing various basic functions.

Meanwhile, data and signaling, which are used in a system for providing a user with immersive contents, can be defined as follows.

Media data may correspond to data of which rendering is available. The media data can include audio, video, text, graphic, images, haptic information, and tactile information. Meanwhile, the media data may correspond to timed data or non-timed data.

Metadata may correspond to data related to other data. In particular, the metadata is unable to be independently rendered. The metadata influences on rendering, processing, and/or orchestration of media data related to the metadata. In other word, the metadata may correspond to data explaining essential data such as media data or data providing additional information related to the essential data.

Similar to the media data, the metadata may correspond to timed metadata or non-timed metadata.

More specifically, the metadata can include media data obtained from a source, data related to an attribute of the source, and/or data capable of being influenced by a sink when the sink performs rendering on media data. According to one embodiment, the metadata can include position information and/or orientation information of a source and/or a sink. In this case, the position information can indicate an absolute position or a relative position and the orientation information can indicate an orientation in a form of orientation information. More specifically, when a source such as a camera or a microphone generates media data, the metadata may correspond to information related to a position or an orientation at which the media data is generated. In this case, similar to the media data generated according to time, the metadata may have a form of timed metadata. And, the timed metadata can be multiplexed with an associated media data.

For example, when a tracker capable of tracking a position and an orientation is attached or included to/in a camera, if the camera moves while capturing images, a position and an orientation of the camera can be sequentially captured. In particular, it is able to generate a data stream for a position and orientation (view) of the camera in addition to a captured video stream.

Similar to the related video stream, the data stream for the position and/or the orientation may have an intrinsic timeline. Hence, the data stream for the position and/or the orientation may become timed metadata.

Orchestration data may correspond to data that orchestrates a plurality of timed data streams. According to one embodiment, the orchestration data can include information on a relationship between timed media data and timed metadata. Meanwhile, the orchestration data itself may become timed data.

The timed data may correspond to data having an intrinsic timeline.

Similarly, the timed metadata may correspond to metadata having an intrinsic timeline.

Method of Supporting Service of Immersive Contents Based on Contents Obtained Via Multiple Devices In the following, a system for providing a user with immersive contents and a signaling method are explained via more specific embodiments. The embodiments described in the following relate to an embodiment of signaling not only media data but also position information and/or orientation information related to the media data to provide a user with immersive contents.

Figure 4:
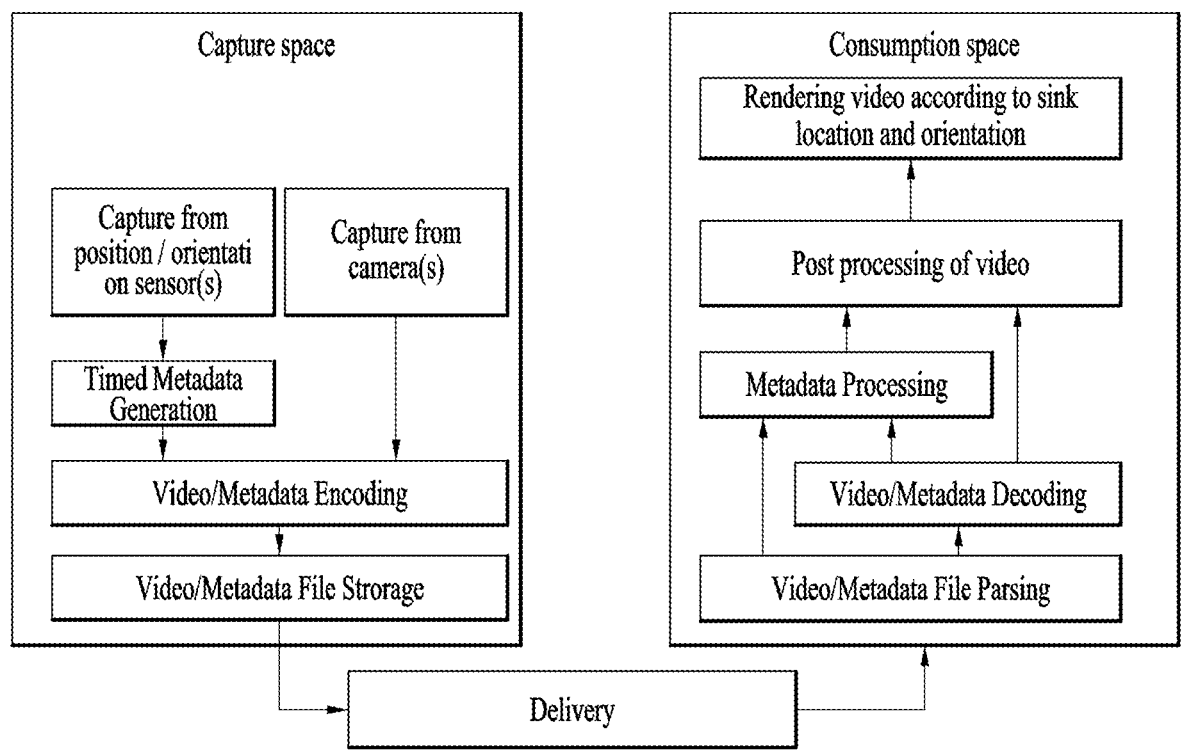
FIG. 4 is a diagram illustrating a system signaling, encoding, storing, and transmitting position information and/or orientation information to provide immersive contents according to one embodiment of the present invention.

FIG. 4 is a diagram illustrating a system signaling, encoding, storing, and transmitting position information and/or orientation (orientation) information to provide immersive contents according to one embodiment of the present invention.

According to an embodiment illustrated in FIG. 4, a position/orientation sensor is included in a camera and the camera obtains position/orientation information at the time of capturing an image.

In the embodiment shown in FIG. 4, a capture space and a consumption space may respectively correspond to the production part and the consumption part illustrated in FIG. 3. And, delivery shown in FIG. 4 may correspond to the multi-domain distribution illustrated in FIG. 3.

Referring to FIG. 4, when a camera captures an image in the capture space, a position/orientation sensor included in the camera obtains position information/orientation information of the camera. According to the present embodiment, when the camera captures an image, it is able to track position/orientation information of the camera at the same time.

In this case, position/orientation data can be generated in a form of timed metadata. In particular, the position/orientation data can be included in the timed metadata. Meanwhile, an image captured by the camera is encoded, is stored in a file format or a transmission stream, and can be forwarded to a consumption space via a transmission network (delivery) such as a broadcast network/Internet. Similarly, the timed metadata is encoded and can be stored in a file format or a transmission stream. The timed metadata can be forwarded to the consumption space via the transmission network (delivery).

In the consumption space, an inverse procedure corresponding to a procedure performed in the capture space can be performed. In particular, a video/metadata file delivered from the capture space is parsed in the consumption space to decode the video/metadata. It may be able to perform post-processing on video based on the metadata processed in the consumption space and rendering can be performed on the video according to position information/orientation information of a sink. In particular, it is able to properly display the video according to position/orientation information of a device in the consumption space based on the position/orientation information of a camera in the capture space.

In the following, information capable of being included in metadata is explained. In particular, position information and orientation information are explained in the following. The position information can include the position information itself and capability information of a sensor for sensing the position information. Similarly, the orientation information can include the orientation information itself and capability information of a sensor for sensing the orientation information. In this case, the position information itself corresponds to position information sensed by a position sensor and the orientation information itself may correspond to orientation information sensed by an orientation sensor. Depending on the context, the position information can be used as a concept including the position information itself and the capability information of the sensor for sensing the position information or a concept indicating the position information itself. Depending on the context, the orientation information can be used as a concept including the orientation information itself and the capability information of the sensor for sensing the orientation information or a concept indicating the orientation information itself.

According to one embodiment, metadata may correspond to timed metadata. In the embodiment, the timed metadata can be used as a concept including position metadata and orientation metadata. Hence, such a term as a timed metadata access unit derived from such a term as a timed metadata corresponds to a concept including a position metadata access unit and an orientation metadata access unit. Such a term as a timed metadata descriptor derived from such a term as a timed metadata corresponds to a concept including a position metadata descriptor and an orientation metadata descriptor.

First of all, capability information of a sensor sensing position information is explained.

When one or more sensors or a device equipped with the sensor is able to obtain position data, capability information of the sensor or the device can be represented by forms illustrated in FIGS. 5 to 9.

An embodiment of FIG. 5 illustrates global position sensor capability including detail information on capability of a global positioning system (GPS) sensor.

The global position sensor capability illustrated in the embodiment of FIG. 5 relates to capability of a GPS sensor providing information on an absolute position.

The meanings of terms used in the global position sensor capability are described in the bottom of the drawing.

Accuracy can describe the degree of closeness of a measured quantity of longitude to it actual value in AccuracyType.

LatitudeAccuracy can describe the degree of closeness of a measured quantity of latitude to its actual value in AccuractType.

Offset can describe the value added to a base value of longitude in order to get to a specific absolute value.

VriousAccuracy can describe the accuracy in various point of view. Each occurrence of this element defines one type of accuracy. This element defines the accuracy by using three attributes defined.

SensorCapabilityBase(SensorCapabilityBaseType) shall be described later with reference to FIGS. 8 to 9.

AccuracyType can describe the accuracy type. For example, AccuracyType can include distance accuracy or reacquisition time.

Value can specify the value of the accuracy.

AccuracyUnit can specify the unit of the accuracy description.

Crs can specify the URI of the coordinate reference system based on which the values of longitude, latitude and altitude are given. The default is urn:ogc:def:crs:EPSG:: 4326 specifying the Coordinate Reference System (CRS) with code 4326 specified in the EPSG database.

LongitudeOffset describes the value added to a base value of longitude in order to get to a specific absolute value.

LatitudeOffset describes the value added to a base value of latitude in order to get to a specific absolute value.

maxOperatingTemp described the number of locations that a bend sensor can sense bending angles.

minOperatingTemp described the distance between the adjacent sensing locations.

Meanwhile, flags included in the global position sensor capability can indicate whether or not corresponding information exists. In particular, latitudeoffsetflag indicate whether or not latitudeoffset exists, longitudeoffsetflag indicates whether or not longitudeoffset exists, maxoperatingtempflag indicates whether or not maxoperatingtemp exists, and minoperatingtempflag can indicate whether or not minoperatingtemp exists.

Variousaccuracycount can indicate the count of accuracy types to be described.

An embodiment of FIG. 6 illustrates position sensor capability including detail information on capability of a position sensor.

Since the position sensor capability illustrated in FIG. 6 relates to capability of a position sensor sensing relative position information, the position sensor capability is different from the capability of the GPS sensor. In particular, the position sensor capability illustrated in FIG. 6 indicates a position sensor rather than the GPS sensor.

The meanings of terms used in the position sensor capability are described in the bottom of the drawing.

SensorCapabilityBase(SensorCapabilityBaseType) shall be described later with reference to FIGS. 8 to 9.

More specifically, unit can describe the unit of th sensor's measuring value.

Range can describe the range that the position sensor can perceive in terms of RangeType in its global coordinate system. Note: The minValue and the maxValue in the SensorCapabilityBaseType are not used for this sensor.

RangeType defines the range in a local coordinate system relative to the position of the sensor in idle state according to the x-, y-, and z-axis.

XminValue describes the minimum value that the position sensor can perceive along the x-axis in the unit of meter.

XmaxValue describes the maximum value that the position sensor can perceive along the x-axis in the unit of meter.

YminValue describes the minimum value that the position sensor can perceive along the y-axis in the unit of meter.

YmaxValue describes the maximum value that the position sensor can perceive along the y-axis in the unit of meter.

ZminValue describes the minimum value that the position sensor can perceive along the z-axis in the unit of meter.

ZmaxValue describes the maximum value that the position sensor can perceive along the z-axis in the unit of meter.

An embodiment of FIG. 7 illustrates altitude sensor capability including detail information on capability of an altitude sensor.

The altitude sensor capability including detail information on capability of an altitude sensor such as an altimeter is described in the embodiment of FIG. 7.

SensorCapabilityBase(SensorCapabilityBaseType) shall be described later with reference to FIGS. 8 to 9.

FIGS. 8 and 9 illustrate a sensor capability base type according to one embodiment of the present invention.

The sensor capability base type described with reference to FIGS. 8 to 9 relates to the sensor capability base (sensor capability base type) mentioned earlier in FIGS. 5 to 7.

The meanings of terms used in the sensor capability base type are described in the bottom of the drawing.

More specifically, SensorCapabilityBaseType provides a base abstract type for a subset of types as part of the sensor device capability metadata types.

AccuracyFlag signals the presence of the accuracy attribute.

TerminalCapabilityBase corresponds to TerminalCapabilityBaseType.

Accuracy describes the degree of closeness of a measured quantity to its actual value as AccuracyType. sensorCapabilityBase Attributes can describe a group of attributes for the sensor capabilities.

AccuracyType becomes a parent type providing a choice of describing the accuracy in either relative value or absolute value. In order to explain the AccuracyType in more detail, the AccuracyTyoe is explained with reference to the bottom of the drawing.

SensorCapabilityBaseAttributes corresponds to SensorCapabilityBaseAttributesType.

The SensorCapabilityBaseAttributesType shall be described later with reference to FIG. 9.

AccuracyType is illustrated in the bottom of FIG. 8.

AccuracySelect described which accuracy scheme is used. "0" means that the PercentAccuracy type shall be used, and "1" means that ValueAccuracy type shall be used.

PercentAccuracy describes the degree of closeness of a measured quantity to its actual value in a relative way using a value ranging from 0 to 1.0. In this case, value provides an actual value in a relative way for accuracy where value 0 means 0% accuracy and value 1.0 means 100% accuracy.

ValueAccuracy describes the degree of closeness of a measured quantity to its actual value in an absolute value of given unit. In this case, value provides an actual value in an absolute way, where the value means the possible range of error as (− value, + value) of given unit.

SensorCapabilityBaseAttributesType is explained with reference to FIG. 9.

unitFlag can signal the presence of the unit attribute.

maxValueFlag can signal the presence of the maxValue attribute.

minValueFlag can signal the presence of the minValue attribute.

offsetFlag can signal the presence of the offset attribute.

numOfLevelsFlag can signal the presence of the numOfLevel attribute.

sensitivityFlag can signal the presence of the sensitivity attribute.

SNRFlag can signal the presence of the SNR attribute.

Unit can describe the unit of the sensor's measuring value, if a unit other than the default unit specified in the semantics of the maxValue and minValue is used for the values of maxValue and minValue are used.

maxValue can describe the maximum value that the sensor can perceive. The terms will be different according to the individual sensor type.

minValue can describe the minimum value that the sensor can perceive. The terms will be different according to the individual sensor type.

Offset can describe the number of value locations added to a base value in order to get to a specific absolute value.

numOfLevels can describe the number of value levels that the sensor can perceive in between maximum and minimum value. For example, the value 5 means the sensor can perceive 5 steps from minValue to maxValue.

Sensitivity can describe the minimum magnitude of input signal required to produce a specified output signal in given unit.

SNR can describe the ratio of a signal power to the noise power corrupting the signal.

As mentioned in the foregoing description, position information can include the position information itself and capability information of a sensor for sensing the position information. In the following, the position information itself, i.e., the sensed position information is explained.

Position data obtained from one or more sensors or a device equipped with the sensor can be represented by a form illustrated in FIGS. 10 to 14.

An embodiment of FIG. 10 illustrates global position data obtained from a global positioning system (GPS) sensor.

The meanings of terms used in the global position data are described in the bottom of the drawing.

SensedInfoBaseType shall be described later with reference to FIG. 13.

Longitude can describe the position of the sensor in terms of degrees of longitude. Positive values represent eastern longitude and negative values represent western longitude.

Latitude can describe the position of the sensor in terms of degrees of latitude. Positive values represent northern latitude and negative values represent southern latitude.

An embodiment of FIG. 11 illustrates altitude data obtained from an altitude sensor.

The meanings of terms used in the altitude data are described in the bottom of the drawing.

SensedInfoBaseType shall be described later with reference to FIG. 13.

Crs specifies the URI of the coordinate reference system based on which the values of longitude, latitude and altitude are given. The default is urn:ogc:def:crs:EPSG::4326 specifying the Coordinate Reference System (CRS) with code 4326 specified in the EPSG database.

Altitude can describe the altitude in the unit of meters.

An embodiment of FIG. 12 illustrates position data obtained from a position sensor.

The meanings of terms used in the position data are described in the bottom of the drawing.

UpdataMode can signal whether the sensed information is in the normal mode or the update mode. In the embodiment, a value of "1" means the update mode is used and "0" means the normal mode is used.

Referring to the bottom of FIG. 12, the normal mode is explained.

PositionFlag can signal the presence of the position information.

unitFlag can signal the presence of the unit information.

SensedInfoBaseType shall be described later with reference to FIG. 13.

Position can describe the 3D value of the position sensor in the unit of meter (m). The origin of the coordinate can be the position of the object sensed at the time of sensor activation. If a calibration has been performed on the position of the sensor, the origin can be the position after the calibration. If this sensed information is used with the PositionSensorCapability information, the origin of the coordinate shall be defined in the PositionSensorCapability.

Unit can specify the unit of the sensed value, if a unit other than the default unit us used.

FIG. 13 illustrates SensedInfoBaseType according to one embodiment of the present invention.

sensedInfoBaseAttributes can describe a group of attributes for the sensed information. In order to explain the sensedInfoBaseAttributesType in more detail, the sensedInfoBaseAttributesType is explained with reference to the bottom of the drawing.

TimeStamp can provide the time information at which the sensed information is acquired.

TimeStampFlag can signal the presence of the TimeStamp element.

The sensedInfoBaseAttributesType is explained with reference to the bottom of FIG. 13.

IDFlag can signal the presence of the ID attribute.

sensorIdRefFlag can signal the presence of the sensorIdRef attribute.

linkedlistFlag can signal the presence of the linkedlist attribute.

groupIDFlag can signal the presence of the groupID attribute.

id may correspond to a unique identifier form identifying individual sensed information.

sensorIdRef references a sensor device that has generated the information included in this specific sensed information.

Linkedlist can describe the multi-sensor structure that consists of a group of sensors in a way that each record contains a reference to the ID of the next sensor.

groupID may correspond to an identifier for a group multi-sensor structure to which this specific sensor belongs.

Activate can describe whether the sensor is activated.

Priority can describe a priority for sensed information with respect to other sensed information sharing the same point in time when the sensed information becomes adapted. A value of "1" indicates the highest priority and larger values indicate lower priorities. The default value of the priority is 1. If there are more than one sensed information with the same priority, the order of process can be determined by the adaptation engine itself.

In the following, an embodiment of storing a position metadata stream in a file format and signaling the position metadata stream and an embodiment of storing a position metadata stream in an MPEG-2 TS and signaling the position metadata stream are sequentially explained.

Embodiment of Storing a Position Metadata Stream of a Source/Sink Associated with a Video/Audio Sample in a File Format and Signaling the Position Metadata Stream The position information can be stored in a file format and signaled. The position information corresponds to data associated with a video sample or an audio sample can include position data of a source or a sink. In this case, the source may correspond to a camera or a microphone positioned at the aforementioned production part or the capture space.

According to one embodiment, position information associated with a video sample or an audio sample can be included in an ISO Base Media File Format (ISO BMFF). In particular, the position information associated with the video sample or the audio sample can be formatted by the ISO BMFF.

In the following, an embodiment of formatting the position information associated with the video sample or the audio sample by the ISO BMFF is explained.

The position information associated with the video sample or the audio sample can be signaled in a manner of being stored in a metadata track of the ISO BMFF.

In this case, an ISOBMFF file can include a media box ('India' box). The media box can include a 'meta' handler type and a null media header ('nmhd'). In this case, the 'meta' handler type can be included in a handler ('hdlr') box of the media box.

When the position information associated with the video sample or the audio sample is signaled in a manner of being stored in the metadata track of the ISO BMFF, a sample description ('stsd') box can include positionMetadataSampleEntry( ) according to one embodiment of the present invention.

In this case, each sample included in the metadata track can include one or more position metadata entities. Each of the position metadata entities can include position data obtained by a sensor and can selectively include capability information of the sensor, i.e., detail information of the sensor capability.

FIG. 14 is a diagram illustrating an ISOBMFF file including position metadata according to one embodiment of the present invention.

FIG. 14 illustrates an ISOBMFF-based file structure and the contents mentioned earlier in FIGS. 1 and 2 can be applied to the ISOBMFF-based file structure as it is. In this case, in the embodiment of FIG. 14, it is necessary to note that metadata rather than media data such as video/audio is included in a sample or a track.

More specifically, the metadata illustrated in FIG. 14 corresponds to a position metadata and can provide position information associated with a video sample or an audio sample. Similar to the video sample or the audio sample associated with the position metadata, the position metadata may correspond to timed data. In particular, the position metadata can be stored in each sample included in a metadata track.

Each sample can include one or more position metadata entities. In the embodiment of FIG. 14, each sample includes two position metadata entities. More specifically, a position metadata entity #1 may correspond to a position metadata entity including the aforementioned global position information and a position metadata entity #1 may correspond to a position metadata entity including position information obtained from a position sensor rather than a GPS. However, the aforementioned configuration is just an example only. Each sample may include 3 or more position metadata entities and position information included in each of the position metadata entities can be different configured.

Meanwhile, as mentioned in the foregoing description, similar to the video sample or the audio sample associated with the position metadata, the position metadata according to one embodiment of the present invention can be configured by timed data. Moreover, the position metadata according to one embodiment of the present invention can include one or more position metadata entities in a unit of a sample. Since one or more position metadata entities are included in each sample unit, related position metadata can be comprehensively signaled. For example, one or more position metadata entities included in a single sample may have the same decoding time or composition time. In particular, if a position metadata entity is delivered via a single sample or a track, position information included in the position metadata entity can be more easily decoded compared to a case that the position information included in the position metadata entity is delivered to an additional sample or a track. Hence, it is able to more efficiently provide immersive content via media orchestration.

FIG. 15 is a diagram illustrating PositionMetadataSampleEntry( ) according to one embodiment of the present invention.

If a position metadata is included in an ISOBMFF file, the PositionMetadataSampleEntry( ) according to one embodiment of the present invention illustrated in FIG. 15 can be included in a sample entry box. The sample entry box can be included in moov and/or moof.

As illustrated, the PositionMetadataSampleEntry ('pmse') can include PositionMetadataConfigurationBox ('pmcb') and the PositionMetadataConfigurationBox provides explanation on a position metadata entity included in each sample. And, the explanation on a position metadata entity included in each sample can also be included in each sample. In this case, the explanation on the position metadata entity included in each sample can override information included in the PositionMetadataSampleEntry( ).

The information provided by the PositionMetadataConfigurationBox are described in the following.

entity_count can indicate the number of position metadata entities included in each sample. As shown in the embodiment of FIG. 14, if two position metadata entities are included in a sample, the entity_count can indicate 2.

entity_size_bytes can indicate a length of bytes of a position metadata entity included in a sample. A length of a sample may be identical to the sum of entity_size_bytes of entities included in the sample. As shown in the embodiment of FIG. 14, if two position metadata entities are included in a sample, a length of the sample may be identical to the sum of entity_size_bytes of a position metadata entity #1 and entity_size_bytes of a position metadata entity #2.

entity_encoding can indicate an encoding format of a position metadata entity included in a sample. For example, 0x00 and 0x01 can indicate a binary format and an XML format, respectively.

sensor_capability_included can indicate whether or not capability information of a sensor/device is included. In this case, the sensor/device may correspond to a sensor/device, which has measured position data included in a position metadata entity within a sample. And, the capability information can be included in the PositionMetadataConfigurationBox or a position metadata entity of each sample. According to one embodiment, if a value of the sensor_capability_included corresponds to '1', it may indicate that the capability information of the sensor/device, which has measured the position data, is included.

position_entity_code can indicate a code name of a position metadata entity. In particular, the position_entity_code may indicate the meaning of position information included in the position metadata entity.

For example, if position information included in the position metadata entity corresponds to global position information measured by a global positioning system (GPS) sensor, the position_entity_code can be configured as position_entity_code="GPS".

As a different example, if position information included in the position metadata entity corresponds to position information measured by a position sensor rather than a GPS sensor, the position_entity_code can be configured as position_entity_code="NGPS".

As a further different example, if position information included in the position metadata entity corresponds to position information measured by an altitude sensor such as an altemeter, the position_entity_code can be configured as position_entity_code="ALTI".

content_encoding can indicate content encoding information when a position metadata entity has an XLM form.

The content_encoding corresponds to a text string ended by a null of UTF-8 character and can provide a MIME type that identifies content encoding of a position metadata. If the content_encoding does not exist (in this case, a text string of a null is provided), a position metadata is not coded. For example, the present field may correspond to 'application/zip'.

namespace is a null-terminated field configured by a space-separated list of UTF-8 character. The namespace is configured by the space-separated list of one or more XML name spaces followed by a position metadata document.

If the namespace is used by metadata, the namespace is necessary for identifying and decoding a type using an XML recognition encoding mechanism such as BiM.

schema_location is configured by a space-separated list of UTF-8 character. The schema_location is a selective null-terminated field configured by more than 0 URL for an XML schema followed by a position metadata document.

Meanwhile, if the sensor_capability_included has a value of 1, a sample entry can include the position_entry_code and the entity_encoding.

Alternatively, a plurality of position metadata entities included in a sample can also be identified via SubSampleInformationBox ('subs'). Meanwhile, the SubSampleInformationBox ('subs') can be included in either SampleTableBox ('stbl') or TrackFragmentBox ('traf') and can include codec_specific_parameters.

In order to identify a plurality of position metadata entities included in a sample via SubSampleInformationBox ('subs'), the codec_specific_parameters of SubSampleInformationBox can be defined by a method illustrated in FIG. 16.

FIG. 16 is a diagram illustrating codec_specific_parameters of SubSampleInformationBox for a metadata entity.

codec_specific_parameters can include sensor_capability_included and position_entity_type.

The contents mentioned earlier in FIG. 15 can be applied to entity_encoding and the sensor_capability_included as it is.

entity_encoding can indicate an encoding format of a position metadata entity included in a sample. For example, 0x00 and 0x01 can indicate a binary format and an XML format, respectively.

sensor_capability_included can indicate whether or not capability information of a sensor/device is included. In this case, the sensor/device may correspond to a sensor/device, which has measured position data included in a position metadata entity within a sample. And, the capability information can be included in the PositionMetadataConfigurationBox or a position metadata entity of each sample. According to one embodiment, if a value of the sensor_capability_included corresponds to '1', it may indicate that the capability information of the sensor/device, which has measured the position data, is included.

position_entity_type can identify a type of position metadata included in a sub sample. For example, if the position_entity_type corresponds to '0', it indicates that position metadata corresponds to global position information. If the position_entity_type corresponds to '1', it indicates that position metadata corresponds to position information obtained by a position sensor or the like. If the position_entity_type corresponds to '2', it indicates that position metadata corresponds to altitude information.

Referring back to FIG. 14, MediaData('mdat') box of a metadata track includes samples. The samples included in the MediaData('mdat') box can be referred to as a position metadata sample and the position metadata sample may correspond to an access unit (AU) of the aforementioned position metadata.

FIG. 17 is a diagram illustrating a position metadata sample according to one embodiment of the present invention.

A position metadata sample can include one or more position metadata entities.

A position metadata sample includes entity count information indicating information on the number of metadata entities and each of position metadata entities can include position information. And, each of the position metadata entities can selectively include sensor capability information.

In the embodiment illustrated in FIG. 17, PositionMetadataEntity(position_entity_code, entity_encoding) indicates position information of each position metadata entity and PositionSensorCapability(position_entity_code, entity_encoding) indicates sensor capability information. The entity_encoding) may or may not exist within a position metadata sample according to flag information indicated by sensor_capability_included.

First of all, the entity_encoding) is explained.

According to one embodiment, if the sensor_capability_included corresponds to 1, a position metadata sample can include the entity_encoding).

PositionSensorCapability(position_entity_code, entity_encoding) can include information on capability of a sensor which has measured position data. More specifically, the entity_encoding) can include cap_size_bytes, gps_cap, pos_cap, and/or alt_cap.

The cap_size_bytes can indicate a length of bytes of capability information of following position sensors.

For example, if the following capability information corresponds to information on a GPS sensor, the cap_size_bytes can indicate a byte length of the gps_cap. If the following capability information corresponds to information on a position sensor rather than the GPS sensor, the cap_size_bytes can indicate a byte length of the pos_cap. If the following capability information corresponds to information on an altitude sensor such as an altemeter, the cap_size_bytes can indicate a byte length of the alt_cap.

Meanwhile, as mentioned in the foregoing description, the entity_encoding can indicate an encoding format of a position metadata entity. According to the embodiment illustrated in FIG. 17, binary encoding is indicated by entity_encoding=0. In this case, the entity_encoding can be differently configured.

As mentioned in the foregoing description, position_entity_code can indicate a code name of a position metadata entity. If the position_entity_code corresponds to "GPS", the entity_encoding) includes the gps_cap. If the the position_entity_code corresponds to "NGPS", the entity_encoding) includes the pos_cap. If the the position_entity_code corresponds to "ALTI", the entity_encoding) can include the alt_cap.

The gps_cap can include detail information on capability of a global positioning system (GPS) sensor. This may correspond to the aforementioned GlobalPositionSensorCapabilityType.

The pos_cap can include detail information on capability of a position sensor rather than the GPS. This may correspond to the aforementioned PositionSensorCapabilityType.

The alt_cap can include detail information on capability of an altitude sensor such as an altimeter. This may correspond to the aforementioned AltitudeSensorCapabilityType.

In the following, PositionMetadataEntity (position_entity_code, entity_encoding) is explained.

A position metadata sample can include PositionMetadataEntity (position_entity_code, entity_encoding).

The PositionMetadataEntity (position_entity_code, entity_encoding) can include information on position data measured by a sensor. More specifically, the PositionMetadataEntity (position_entity_code, entity_encoding) can include global_position, position, and/or altitude.

Meanwhile, as mentioned in the foregoing description, the entity_encoding can indicate an encoding format of a position metadata entity. According to the embodiment illustrated in FIG. 17, binary encoding is indicated by entity_encoding=0. In this case, the entity_encoding can be differently configured.

As mentioned in the foregoing description, position_entity_code can indicate a code name of a position metadata entity. If the position_entity_code corresponds to "GPS", the entity_encoding) includes global_position. If the the position_entity_code corresponds to "NGPS", the entity_encoding) includes position. If the the position_entity_code corresponds to "ALTI", the entity_encoding) can include altitude.

The global_position can include global position data obtained from a GPS sensor. This may correspond to the aforementioned GlobalPositionSnsorType.

The position can include position data obtained from a position sensor. This may correspond to the aforementioned PositionSensorType.

The altitude can include altitude data obtained from an altitude sensor such as an altimeter. This may correspond to the aforementioned AltitudeSensorType.

A position data can be stored and delivered via a separate track in a manner of being included in a position metadata sample. If the position data is delivered in a manner of being included in the separate track, referencing is required between the track including the position data and a video/audio track associated with the track including the position data.

According to one embodiment, referencing can be performed between the track including the position data and the video/audio track associated with the track including the position data using a 'cdsc' reference type predefined in a TrackReferenceBox ('tref') box corresponding to one of boxes of ISOBMFF.

According to a different embodiment, referencing can be performed between the track including the position data and the video/audio track associated with the track including the position data by newly defining such a reference type as 'pmet' in the TrackReferenceBox ('tref') box.

According to a further different embodiment, it may perform referencing between the track including the position data and a track including orientation data to be described in the following.

FIG. 18 is a diagram illustrating reference types for a tref box and a position metadata track according to one embodiment of the present invention.

A TrackReference('tref') box corresponds to a box providing a reference between a track included in the TrackReference('tref') box and a different track. The TrackReference('tref') box can include a prescribed reference type and one or more track reference type boxes having an identifier.

Track_ID may correspond to an integer providing a reference to a different track within presentation in an included track. The track_ID is not reused and may not become 0.

Reference type can be configured by one of values described in the following. Moreover, the reference type can be configured by a value not defined in the following.

'hint'—the referenced track(s) contain the original media for this hint track.

'cdsc'—this track describes the referenced track. This track contains timed metadata for referenced track.

'font'—this track uses fonts carried/defined in the referenced track.

'hind'—this track depends on the referenced hint track, i.e., it should only be used if the referenced hint track is used.

'vdep'—this track contains auxiliary depth video information for the referenced video track.

'vplx'—this track contains auxiliary parallax video information for the referenced video track.

'subt'—this track contains subtitle, timed text or overlay graphical information for the referenced track or any track in the alternate group to which the track belongs, if any.

'pmet'—this track contains position information for the references track. According to one embodiment, a track including the tref box having the reference_type corresponds to a metadata track delivering position information. The track can reference a track delivering relevant media data via track_IDs. According to a different embodiment, a track including the tref box having the reference_type corresponds to a track delivering media data and may be able to reference a metadata track delivering position information via track_IDs.

In the embodiments mentioned earlier with reference to FIGS. 14 to 17, a method of storing position metadata entities indicating the same position information in a single sample of the same track has been explained.

On the other hand, the position metadata entities indicating the same position information can be stored in a manner of being divided into a different track. In this case, each sample can be configured to include a single position metadata entity. In particular, when the position metadata entities are included in a plurality of tracks in a manner of being divided, the position metadata entities can be synchronized by time information provided by an ISO BMFF. For example, the position metadata entities can be synchronized by DT (decoding time) or composition time provided by a Decoding Time to Sample ('stts') box of the ISO BMFF. More specifically, samples including the position metadata entities for position information of the same timing may have the same DT (decoding time) or the same composition time provided by 'stts' box.

In particular, if the position metadata entities indicating the same position information are stored in a manner of being divided into a different track, it is necessary to identify that the tracks have the same position information. When the position metadata entities indicating the same position information are stored in a manner of being divided into a different track, in order to identify that the tracks have the same position information, it may consider a method described in the following.

According to one embodiment, it may be able to define 'pmbs' (position metadata base) as a new reference type value of TrackReferenceBox ('tref'). And, a track can be configured as a base track. Subsequently, it may be able to configure other tracks to refer to the base track with 'pmbs' reference type. According to the embodiment, other tracks referring to the base track with the 'pmbs' reference type have position information identical to that of the base track.

As a different embodiment, it may be able to define a new track group type of a TrackGroupBox ('trgr'). The TrackGroupBox ('trgr') corresponds to a box included in trackBox ('trak') and includes track_group_type indicating a grouping type.

It may be able to define 'pmtg' (position metadata track group) as the new track group type of the TrackGroupBox ('trgr'). And, it may be able to configure tracks to have the same track_group_id value with the track group type of 'ptmg'. According to the present embodiment, it may be able to indicate that tracks having the same track group ID value correspond to tracks storing the same position information with the track_group_type of 'pmtg' within the TrackGroupBox.

Embodiment of Multiplexing a Position Metadata Stream of a Source/Sink Associated with a Video/Audio Stream with MPEG-2 TS and Signaling the Position Metadata Stream An embodiment of storing position information in a file format and signaling the position information has been explained with reference to FIGS. 14 to 18.

In the following description, an embodiment of multiplexing position information with MPEG-2 TS and signaling the position information is explained.

Position information corresponds to data associated with a video sample or an audio sample and can include position data of a source or a sink. In this case, the source may correspond to a camera or a microphone existing in the aforementioned production part of the capture space.

The position information associated with the video sample or the audio sample can be stored and signaled via MPEG-2 TS. In particular, the position information associated with the video sample or the audio sample can be included in the MPEG-2 TS.

The video sample or the audio sample can be coded by an access unit for presentation. Similarly, the position information associated with the video sample or the audio sample can be coded by a position access unit. In particular, position information having a form of timed metadata can be coded by a position access unit corresponding to an access unit (AU) for a media sample.

FIG. 19 is a diagram illustrating a position access unit including position metadata according to one embodiment of the present invention.

A position access unit can include fields illustrated in FIG. 19.

entity_count can indicate the number of position metadata entities existing in an access unit, i.e., a position access unit, of each position metadata.

Meanwhile, a position metadata entity used for the embodiment of storing and signaling the position information associated with the video sample or the audio sample via MPEG-2 TS is practically identical to a position metadata entity used for the embodiment using the file format. In particular, the aforementioned explanation on the position metadata entity can be applied to the embodiment using the MPEG-2 TS as it is within a range where a contradiction does not occur.

entity_size_bytes can indicate a length of bytes of a position metadata entity (position access unit) within a position access unit.

entity_encoding can indicate an encoding format of a position metadata entity included in a position access unit. For example, 0x00 and 0x01 can indicate a binary format and an XML format, respectively.

sensor_capability_included can indicate whether or not capability information of a sensor/device is included. In this case, the sensor/device may correspond to a sensor/device, which has measured position data included in a position metadata entity within a position access unit. And, the capability information can be included in each position metadata entity within a position access unit. According to one embodiment, if a value of the sensor_capability_included corresponds to '1', it may indicate that the capability information of the sensor/device, which has measured the position data, is included.

position_entity_code can indicate a code name of a position metadata entity. In particular, the position_entity_code may indicate the meaning of position information included in the position metadata entity. In particular, the position_entity_code can indicate global position information measured by a global positioning system (GPS) sensor (position_entity_code="GPS"), position information measured by a position sensor rather than a GPS sensor (position_entity_code="NGPS"), or altitude information measured by an altimeter (position_entity_code="ALTI").

position_sensor_capability_len can indicate a length of bytes of capability information of following position sensors. In particular, the position_sensor_capability_len can indicate a length of gps_cap, pos_cap, and/or alt_cap.

As mentioned in the foregoing description, the position_entity_code can indicate a code name of a position metadata entity. If the position_entity_code corresponds to "GPS", the position metadata entity includes the gps_cap. If the the position_entity_code corresponds to "NGPS", the position metadata entity includes the pos_cap. If the the position_entity_code corresponds to "ALTI", the position metadata entity can include the alt_cap.

The gps_cap can include detail information on capability of a global positioning system (GPS) sensor. This may correspond to the aforementioned GlobalPositionSensorCapabilityType.

The pos_cap can include detail information on capability of a position sensor rather than the GPS. This may correspond to the aforementioned PositionSensorCapabilityType.

The alt_cap can include detail information on capability of an altitude sensor such as an altimeter. This may correspond to the aforementioned AltitudeSensorCapabilityType.

The embodiment of storing and signaling the position information associated with the video sample or an audio sample via the MPEG-2 TS can further include DTS information and PTS information described in the following.

media_DTS may be practically identical to 33-bit DTS specified in a PES header. The media_DTS can indicate the timing at which corresponding position metadata entity information is decoded. Or, the media_DTS can be used for indicating an associated video/audio access unit. For example, in order to present a video/audio access unit having the same DTS value, information included in a corresponding position metadata entity can be used.

display_in_PTS may be practically identical to 33-bit PTS specified in a PES header. The display_in_PTS can indicate the timing at which corresponding position metadata entity information is presented. Or, the display_in_PTS can be used for indicating an associated video/audio access unit. For example, in order to present a video/audio access unit having the same PTS value, information included in a corresponding position metadata entity can be used.

As mentioned in the foregoing description, position_entity_code can indicate a code name of a position metadata entity. If the position_entity_code corresponds to "GPS", a position metadata entity includes global_position. If the the position_entity_code corresponds to "NGPS", the position metadata entity includes position. If the the position_entity_code corresponds to "ALTI", the position metadata entity can include altitude.

The global_position can include global position data obtained from a GPS sensor. This may correspond to the aforementioned GlobalPositionSnsorType.

The position can include position data obtained from a position sensor. This may correspond to the aforementioned PositionSensorType.

The altitude can include altitude data obtained from an altitude sensor such as an altimeter. This may correspond to the aforementioned AltitudeSensorType.

Meanwhile, a part of the fields illustrated in the drawing can be selectively omitted.

According to one embodiment, a media_DTS field and/or a display in a PTS field may not be included in a position access unit. According to the present embodiment, it is unable to use DTS information and PTS information included in a PES header.

According to one embodiment, a position access unit can be transmitted with a scheme similar to a scheme of transmitting an AU including a media sample.

According to a different embodiment, a position access unit can be transmitted via MPEG-2 TS in a manner of being included in an MPEG-2 private section.

FIG. 20 is a diagram illustrating an MPEG-2 private section according to one embodiment of the present invention.

Referring to FIG. 20, an MPEG-2 private section according to one embodiment of the present invention includes a position access unit and an information field.

table_id can identify a table to which the MPEG-2 private section belongs. In particular, the table_id corresponds to an identifier indicating that the MPEG-2 private section corresponds to a table including a position access unit.

section_syntax_indicator corresponds to an indicator. If a value of the section_syntax_indicator is configured by '1', a private section is concatenated after normal section syntax equal to or greater than a private_section_length field. If the value of the section_syntax_indicator is configured by '0', it may indicate that private_data_bytes is concatenated immediately after the private_section_length field.

A private_indicator field corresponds to a flag capable of being defined by a user.

A private_section_length field can describe the remaining number of bytes of a private section positioned immediately after the private_section_length field.

A position_access_unit( ) field corresponds to a position access unit.

The MPEG-2 private section, i.e., position_access_unit section( ) transmitting a position access unit, can be transmitted in a manner of being included in a single TS packet and an access unit of each position metadata may become a random access point.

Meanwhile, in order to make a receiver identify an MPEG-2 transport stream including an access unit, it may be able to define stream_type of the MPEG-2 transport stream including the access unit. And, it may be able to apply a value of the stream_type of the MPEG-2 transport stream including the access unit to system information. The system information can include PSI/PSIP (Program Specific Information/Program and System Information Protocol).

The PSI can include PAT (Program Association Table), CAT (Conditional Access Table), PMT (Program Map Table), and NIT (Network Information Table).

The PAT corresponds to special information transmitted by a packet of which PID corresponds to '0'. The PAT transmits PID information of the PMT and PID information of the NIT according to a program. The CAT transmits information on a charged broadcast system used by a transmitting side. The PMT transmits a program identification number, PID information of a transport stream packet transmitting an individual bit stream such as video, audio, etc. constructing a program, and PID information forwarding PCR. The NIT transmits information on an actual transmission network. For example, it is able to find out a program number and PID of the PMT by parsing the PAT of which PID corresponds to 0. If parsing is performed on PMT obtained from the PAT, it is able to know a correspondence between configuration elements that construct a program.

The PAT provides a correspondence between PID values of a transport stream packet that forwards a program number and program definition. The program number may correspond to a number label associated with a program. And, the entire tables of the PAT can be included in one or more sections and can be segmented to occupy a plurality of sections. The PAT can include table ID information and the table ID information can identify contents of a transport stream section. According to one embodiment, the table ID of the PAT can allocate a value of 0x0B to identify a media orchestration section.

According to one embodiment, the system information may correspond to a program map table (PMT) of program-specific information (PSI).

In particular, if such a random value as '0x30' is applied to the stream_type of the PMT, it is able to make a receiver and the like recognize that the MPEG-2 transport stream corresponds to a is packet stream including an AU of position metadata.

FIG. 21 is a diagram illustrating PMT according to one embodiment of the present invention.

A program map table (PMT) can provide mapping between a program number and a program element. A single instance of the mapping is referred to as "program definition". The PMT corresponds to the sum of all program definitions for a transport stream. The PMT should be transmitted via a packet and a PID value of the PMT is selected by an encoder. If necessary, it may use two or more PID values. The table can be included in one or more sections together with the illustrated syntax or can be segmented to occupy a plurality of sections. A section number field is set to 0 in each section and a section can be identified by a program_number field.

A table_id field corresponds to a table identifier and can configure an identifier for identifying PMT.

A section_syntax_indicator field corresponds to an indicator that defines a section type of PMT.

A section_length field indicates a section length of PMT.

A program_number field indicates a program number as information matched with PAT.

A version_number field indicates a version number of PMT.

A current_next_indicator field corresponds to an indicator indicating whether or not a current table section is applicable.

A section_number field indicates a section number of a current PMT section when PMT is transmitted in a manner of being divided into one or more sections.

A last_section_number field indicates the last section number of PMT.

A PCR_PID field indicates a PID of a packet forwarding a PCR (program clock reference) of a current program.

A program_info_length field indicates length information of a descriptor appearing immediately after the program_info_length field by the number of bytes. In particular, the program_info_length field indicates lengths of descriptors included in a first loop.

A stream_type field indicates a type of an element stream included in a packet having a PID value indicated by a following elementary PID field and coding information.

As mentioned in the foregoing description, if such a random value as '0x30' is applied to the stream_type, it is able to make a receiver and the like recognize that the MPEG-2 transport stream corresponds to a is packet stream including an AU of position metadata. In particular, the, stream_type field can indicate that the MPEG-2 transport stream included in a PMT section transmits an access unit for media orchestration.

An elementary PID field indicates a PID value of a packet including an identifier of the element stream (i.e., the element stream).

An ES_Info_length field indicates length information of a descriptor appearing immediately after the ES_Info_length field by the number of bytes. In particular, the ES_Info_length field indicates lengths of descriptors included in a second loop.

Descriptors of a program level are included in a descriptor( ) region of the first loop of the PMT and descriptors of a stream level are included in a descriptor( ) region of the second loop of the PMT. In particular, the descriptors included in the first loop correspond to descriptors individually applied to each program and the descriptors included in the second loop correspond to descriptors individually applied to each ES.

According to one embodiment, as shown in the following, position metadata information can be transmitted in a descriptor form.

FIG. 22 is a diagram illustrating a position metadata descriptor according to one embodiment of the present invention.

Referring to FIG. 22, a position metadata descriptor according to one embodiment of the present invention includes information described in the following.

entity_count can indicate the number of position metadata entities existing in an access unit of position metadata included in an associated MPEG-2 transport stream.

entity_size_bytes can indicate a length of bytes of a position metadata entity within an access unit of position metadata included in an associated MPEG-2 transport stream.

entity_encoding can indicate an encoding format of a position metadata entity included in an access unit of position metadata included in an associated MPEG-2 transport stream. For example, 0x00 and 0x01 can indicate a binary format and an XML format, respectively.

sensor_capability_included can indicate whether or not capability information of a sensor/device is included. In this case, the sensor/device may correspond to a sensor/device, which has measured position data included in a position metadata entity within a position access unit of position metadata included in an associated MPEG-2 transport stream. If a value of the sensor_capability_included corresponds to '1', it may indicate that the capability information of the sensor/device, which has measured the position data, is included in a corresponding descriptor or a position metadata entity.

position_entity_code can indicate a code name of a position metadata entity included in an access unit of position metadata included in an associated MPEG-2 transport stream. In particular, the position_entity_code can indicate global position information measured by a global positioning system (GPS) sensor (position_entity_code="GPS"), position information measured by a position sensor rather than a GPS sensor (position_entity_code="NGPS"), or altitude information information measured by an altimeter (position_entity_code="ALTI").

position_sensor_capability_len can indicate a length of bytes of gps_cap, pos_cap, and alt_cap.

The gps_cap can include detail information on capability of a global positioning system (GPS) sensor. This may correspond to the aforementioned GlobalPositionSensorCapabilityType.

The pos_cap can include detail information on capability of a position sensor rather than the GPS. This may correspond to the aforementioned PositionSensorCapabilityType.

The alt_cap can include detail information on capability of an altitude sensor such as an altimeter. This may correspond to the aforementioned AltitudeSensorCapabilityType.

Since a position metadata descriptor (position extension descriptor) is transmitted one time only according to an event or a program, the position metadata descriptor can be signaled using a descriptor of PMT. According to one embodiment, the position metadata descriptor (position extension descriptor) may appear at a base stream loop of a PID providing position information.

According to a different embodiment, the position extension descriptor can be transmitted in a manner of being included in extension_descriptor of MPEG-2 TS.

FIG. 23 is a diagram illustrating a shape of a position metadata descriptor transmitted in an extension_descriptor form of MPEG-2 according to one embodiment of the present invention.

According to the embodiment illustrated in FIG. 23, if a descriptor tag of extenstion_descriptor has a value of 0x10, it may indicate that the extenstion_descriptor corresponds to a position metadata descriptor. In particular, the descriptor tag of the extenstion_descriptor can indicate that the extenstion_descriptor corresponds to a timed metadata such as a position metadata descriptor.

In the foregoing description, position information has been explained as information capable of being included in metadata.

In the following, orientation information is explained as information capable of being included in metadata. Similar to position information, the orientation information can include the orientation information itself and capability information of a sensor for sensing the orientation information. In this case, the orientation information itself may correspond to orientation information sensed by an orientation sensor. Depending on the context, the orientation information can be used as a concept including the orientation information itself and the capability information of the sensor for sensing the orientation information or a concept indicating the orientation information itself.

First of all, capability information of a sensor sensing orientation information is explained.

When one or more sensors or a device equipped with the sensor is able to obtain orientation data, capability information of the sensor or the device can be represented by forms illustrated in FIG. 24.

An embodiment of FIG. 24 illustrates orientation sensor capability including detail information on capability of an orientation sensor.

The meanings of terms used in the orientation sensor capability are described in the bottom of the drawing.

OrientationRange can describe the range that the orientation sensor can perceive in terms of OrientationRangeType.

OrientationRangeType defines the range from the local coordinate system according to the Yaw, Pitch, and Roll.

Meanwhile, the Yaw, Pitch, and Roll correspond to parameters used for describing a 3D space using aircraft principal axes. An aircraft can freely rotate in 3D. Axes forming 3D are referred to as a pitch axis, a yaw axis, and a roll axis, respectively. In the present specification, the axes can be simply represented as pitch, yaw, and roll or pitch orientation, yaw orientation, and roll orientation.

The pitch axis may correspond to an axis becoming a reference of rotating a front nose of an aircraft in up/down direction. According to the aircraft principal axes concept, the pitch axis may correspond to an axis extended from a wing to a wing of an aircraft.

The yaw axis may correspond to an axis becoming a reference of rotating a front nose of an aircraft in left/right direction. According to the aircraft principal axes concept, the yaw axis may correspond to an axis extended from the top to the bottom of an aircraft.

According to the aircraft principal axes concept, the roll axis may correspond to an axis extended from a front node of an aircraft to a tail of the aircraft. If the aircraft rotates in roll orientation, it may indicate that the aircraft rotates on the base of the roll axis.

YawMin can describe the minimum value that the orientation sensor can perceive for Yaw in the unit of degree.

YawMax can describe the maximum value that the orientation sensor can perceive for Yaw in the unit of degree.

PitchMin can describe the minimum value that the orientation sensor can perceive for Pitch in the unit of degree.

PitchMax can describe the maximum value that the orientation sensor can perceive for Pitch in the unit of degree.

RollMin can describe the minimum value that the orientation sensor can perceive for Roll in the unit of degree.

RollMax can describe the maximum value that the orientation sensor can perceive for Roll in the unit of degree.

As mentioned in the foregoing description, orientation information includes orientation information itself and capability information of a sensor for sensing the orientation information. In the following, the orientation information itself is explained.

An embodiment of FIG. 25 illustrates orientation data obtained from an orientation sensor.

The meanings of terms used in the orientation data are described in the bottom of the drawing.

UpdateMode can signal whether the sensed information is in the normal mode or on the update mode. In the illustrated embodiment, a value of "1" means the update mode is used and "0" means the normal mode is used.

Referring to the bottom of the drawing, the normal mode is explained.

OrientationFlag can indicate the presence of orientation information.

unitFlag can indicate the presence of unit information.

Orientation can describe the sensed value by the orientation sensor in three dimensional vector in the unit of degree. The orientation is measured as the inclined degree (orientation) with respect to the original pose. The original pose is the pose of the object sensed at the time of sensor activation. If a calibration has been performed on the orientation of the sensor after activation, the orientation after the calibration is considered as the original pose of the object.

Unit can specify the unit of the sensed value, if a unit other than the default unit is used.

In the following, an embodiment of storing an orientation metadata stream in a file format and signaling the orientation metadata stream and an embodiment of storing an orientation metadata stream in an MPEG-2 TS and signaling the orientation metadata stream are sequentially explained.

Embodiment of Storing an Orientation Metadata Stream of a Source/Sink Associated with a Video/Audio Sample in a File Format and Signaling the Orientation Metadata Stream The orientation information can be stored in a file format and signaled. The orientation information corresponds to data associated with a video sample or an audio sample can include orientation data of a source or a sink. In this case, the source may correspond to a camera or a microphone positioned at the aforementioned production part or the capture space.

According to one embodiment, orientation information associated with a video sample or an audio sample can be included in ISO Base Media File Format (ISO BMFF). In particular, orientation information associated with a video sample or an audio sample can be formatted by ISO BMFF.

According to a different embodiment, orientation information associated with a video sample or an audio sample can be included in a CommonFileFormat. In particular, the orientation information associated with the video sample or the audio sample can be formatted by the CommonFileFormat.

In the following, an embodiment of formatting the orientation information associated with the video sample or the audio sample by the ISO BMFF is explained.

The orientation information associated with the video sample or the audio sample can be signaled in a manner of being stored in a metadata track of the ISO BMFF.

In this case, an ISOBMFF file can include a media box ('mdia' box). The media box can include a 'meta' handler type and a null media header ('nmhd'). In this case, the 'meta' handler type can be included in a handler ('hdlr') box of the media box.

When the orientation information associated with the video sample or the audio sample is signaled in a manner of being stored in the metadata track of the ISO BMFF, a sample description ('stsd') box can include orientationMetadataSampleEntry( ) according to one embodiment of the present invention.

In this case, each sample stored in the metadata track can include one or more orientation metadata entities. Each of the orientation metadata entities can include orientation data obtained by a sensor and can selectively include capability information of the sensor, i.e., detail information of the sensor capability. And, each of the orientation metadata entities can selectively include detail information on an orientation range.

FIG. 26 is a diagram illustrating an ISOBMFF file including orientation metadata according to one embodiment of the present invention.

FIG. 26 illustrates an ISOBMFF-based file structure and the contents mentioned earlier in FIGS. 1 and 2 can be applied to the ISOBMFF-based file structure as it is. In this case, in the embodiment of FIG. 26, it is necessary to note that metadata rather than media data such as video/audio is included in a sample or a track.

More specifically, the metadata illustrated in FIG. 26 corresponds to orientation metadata and can provide orientation information associated with a video sample or an audio sample. Similar to the video sample or the audio sample associated with the orientation metadata, the orientation metadata may correspond to timed data. In particular, the orientation metadata can be stored in each sample included in a metadata track.

Each sample can include one or more orientation metadata entities. In the embodiment of FIG. 26, each sample includes two orientation metadata entities. More specifically, an orientation metadata entity #1 may correspond to an orientation metadata entity including the orientation information sensed by a first orientation sensor and an orientation metadata entity #2 may correspond to an orientation metadata entity including orientation information sensed by a second orientation sensor. However, the aforementioned configuration is just an example only. Each sample may include 3 or more orientation metadata entities and orientation information included in each of the orientation metadata entities can be different configured.

Meanwhile, as mentioned in the foregoing description, similar to the video sample or the audio sample associated with the orientation metadata, the orientation metadata according to one embodiment of the present invention can be configured by timed data. Moreover, the orientation metadata according to one embodiment of the present invention can include one or more orientation metadata entities in a unit of a sample. Since one or more orientation metadata entities are included in each sample unit, related orientation metadata can be comprehensively signaled. In particular, if an orientation metadata entity is delivered via a single sample or a track, orientation information included in the orientation metadata entity can be more easily decoded compared to a case that the orientation information included in the orientation metadata entity is delivered to an additional sample or a track. Hence, it is able to more efficiently provide immersive content via media orchestration.

FIG. 27 is a diagram illustrating OrientationMetadataSampleEntry( ) according to one embodiment of the present invention.

If an orientation metadata is included in an ISOBMFF file, the OrientationMetadataSampleEntry( ) according to one embodiment of the present invention illustrated in FIG. 27 can be included in a sample entry box. The sample entry box can be included in moov and/or moof.

As illustrated, the OrientationMetadataSampleEntry ('omse') can include OrientationMetadataConfigurationBox ('omcb') and the OrientationMetadataConfigurationBox provides explanation on an orientation metadata entity included in each sample. And, the explanation on an orientation metadata entity included in each sample can also be included in each sample. In this case, the explanation on the orientation metadata entity included in each sample can override information included in the OrientationMetadataSampleEntry( ).

The information provided by the OrientationMetadataConfigurationBox are described in the following.

entity_count can indicate the number of orientation metadata entities included in each sample. As shown in the embodiment of FIG. 27, if two orientation metadata entities are included in a sample, the entity_count can indicate 2.

entity_size_bytes can indicate a length of bytes of an orientation metadata entity included in a sample. A length of a sample may be identical to the sum of entity_size_bytes of entities included in the sample. As shown in the embodiment of FIG. 26, if two orientation metadata entities are included in a sample, a length of the sample may be identical to the sum of entity_size_bytes of an orientation metadata entity #1 and entity_size_bytes of an orientation metadata entity #2.

entity_encoding can indicate an encoding format of an orientation metadata entity included in a sample. For example, 0x00 and 0x01 can indicate a binary format and an XML format, respectively.

sensor_capability_included can indicate whether or not capability information of a sensor/device is included. In this case, the sensor/device may correspond to a sensor/device, which has measured orientation data included in an orientation metadata entity within a sample. And, the capability information can be included in the OrientationMetadataConfigurationBox or an orientation metadata entity of each sample. According to one embodiment, if a value of the sensor_capability_included corresponds to '1', it may indicate that the capability information of the sensor/device, which has measured the orientation data, is included.

orientation_entity_code can indicate a code name of an orientation metadata entity. In particular, the orientation_entity_code may indicate the meaning of orientation information included in the orientation metadata entity.

For example, if orientation information included in the orientation metadata entity corresponds to orientation information measured by an orientation sensor, the orientation_entity_code can be configured as orientation_entity_code="ORIN".

content_encoding can indicate content encoding information when an orientation metadata entity has an XLM form.

The content_encoding corresponds to a text string ended by a null of UTF-8 character and can provide a MIME type that identifies content encoding of an orientation metadata. If the content_encoding does not exist (in this case, a text string of a null is provided), an orientation metadata is not coded. For example, the present field may correspond to 'application/zip'.

namespace is a null-terminated field configured by a space-separated list of UTF-8 character. The namespace is configured by the space-separated list of one or more XML name spaces followed by an orientation metadata document.

If the namespace is used by metadata, the namespace is necessary for identifying and decoding a type using an XML recognition encoding mechanism such as BiM.

schema_location is configured by a space-separated list of UTF-8 character. The schema_location is a selective null-terminated field configured by more than 0 URL for an XML schema followed by an orientation metadata document.

Meanwhile, if the sensor_capability_included has a value of 1, a sample entry can include the orientation_entry_code and the entity_encoding.

Alternatively, a plurality of orientation metadata entities included in a sample can also be identified via SubSampleInformationBox('subs'). Meanwhile, the SubSampleInformationBox('subs') can be included in either SampleTableBox('stbl') or TrackFragmentBox('traf') and can include codec_specific_parameters.

In order to identify a plurality of orientation metadata entities included in a sample via SubSampleInformationBox ('subs'), the codec_specific_parameters of SubSampleInformationBox can be defined by a method illustrated in FIG. 16.

codec_specific_parameters can include sensor_capability_included and orientation_entity_type.

The contents mentioned earlier in FIG. 15 can be applied to entity_encoding and the sensor_capability_included as it is.

entity_encoding can indicate an encoding format of an orientation metadata entity included in a sample. For example, 0x00 and 0x01 can indicate a binary format and an XML format, respectively.

sensor_capability_included can indicate whether or not capability information of a sensor/device is included. In this case, the sensor/device may correspond to a sensor/device, which has measured orientation data included in an orientation metadata entity within a sample. And, the capability information can be included in the OrientationMetadataConfigurationBox or an orientation metadata entity of each sample. According to one embodiment, if a value of the sensor_capability_included corresponds to '1', it may indicate that the capability information of the sensor/device, which has measured the orientation data, is included.

orientation_entity_type can identify a type of orientation metadata included in a sub sample.

Referring back to FIG. 26, MediaData('mdat') box of a metadata track includes samples. The samples included in the MediaData('mdat') box can be referred to as an orientation metadata sample and the orientation metadata sample may correspond to the aforementioned orientation metadata.

FIG. 28 is a diagram illustrating an orientation metadata sample according to one embodiment of the present invention.

An orientation metadata sample can include one or more orientation metadata entities.

An orientation metadata sample includes entity count information indicating information on the number of orientation metadata entities and each of orientation metadata entities can include orientation information. And, each of the orientation metadata entities can selectively include sensor capability information.

In the embodiment illustrated in FIG. 28, entity_encoding) indicates orientation information of each orientation metadata entity and entity_encoding) indicates sensor capability information. The entity_encoding) may or may not exist within an orientation metadata sample according to flag information indicated by sensor_capability_included.

First of all, the entity_encoding) is explained.

According to one embodiment, if the sensor_capability_included corresponds to 1, an orientation metadata sample can include the entity_encoding).

OrientationSensorCapability(orientation_entity_code, entity_encoding) can include information on capability of a sensor which has measured orientation data. More specifically, the entity_encoding) can include cap_size_bytes, and/or orin_cap.

The cap_size_bytes can indicate a length of bytes of capability information of following orientation sensors. For example, if the following capability information corresponds to information on an orientation sensor, the cap_size_bytes can indicate a byte length of the orin_cap.

Meanwhile, as mentioned in the foregoing description, the entity_encoding can indicate an encoding format of an orientation metadata entity. According to the embodiment, binary encoding is indicated by entity_encoding=0. In this case, the entity_encoding can be differently configured.

As mentioned in the foregoing description, orientation_entity_code can indicate a code name of an orientation metadata entity. If the orientation_entity_code corresponds to "ORIN", the entity_encoding) includes the orin_cap.

The orin_cap can include detail information on capability of an orientation sensor. This may correspond to the aforementioned OrientationSensorCapabilityType.

In the following, OrientationMetadataEntity (orientation_entity_code, entity_encoding) is explained.

An orientation metadata sample can include OrientationMetadataEntity (orientation_entity_code, entity_encoding).

The OrientationMetadataEntity (position_entity_code, entity_encoding) can include information on orientation data measured by a sensor. More specifically, the OrientationMetadataEntity (orientation_entity_code, entity_encoding) can include orientation.

Meanwhile, as mentioned in the foregoing description, the entity_encoding can indicate an encoding format of an orientation metadata entity. According to the illustrated embodiment, binary encoding is indicated by entity_encoding=0. In this case, the entity_encoding can be differently configured.

As mentioned in the foregoing description, orientation_entity_code can indicate a code name of an orientation metadata entity. If the orientation_entity_code corresponds to "ORIN", the entity_encoding) can include orientation.

The orientation can include orientation data obtained from an orientation sensor. This may correspond to the aforementioned OrientationSensorType.

An orientation data can be stored and delivered via a separate track in a manner of being included in an orientation metadata sample. If the orientation data is delivered in a manner of being included in the separate track, referencing is required between the track including the orientation data and a video/audio track associated with the track including the orientation data.

According to one embodiment, referencing can be performed between the track including the orientation data and the video/audio track associated with the track including the orientation data using a 'cdsc' reference type predefined in a TrackReferenceBox ('tref') box corresponding to one of boxes of ISOBMFF.

According to a different embodiment, referencing can be performed between the track including the orientation data and the video/audio track associated with the track including the orientation data by newly defining such a reference type as 'omet' in the TrackReferenceBox ('tref') box.

According to a further different embodiment, it may perform referencing between the track including the orientation data and a track including the aforementioned position data.

FIG. 29 is a diagram illustrating reference types for a tref box and an orientation metadata track according to one embodiment of the present invention.

A TrackReference('tref') box corresponds to a box providing a reference between a track included in the TrackReference('tref') box and a different track. The TrackReference('tref') box can include a prescribed reference type and one or more track reference type boxes having an identifier.

Track_ID may correspond to an integer providing a reference to a different track within presentation in an included track. The track_ID is not reused and may not become 0.

Reference_type can be configured by one of values described in the following. Moreover, the reference_type can be configured by a value not defined in the following.

'hint'—the referenced track(s) contain the original media for this hint track.

'cdsc'—this track describes the referenced track. This track contains timed metadata for referenced track.

'font'—this track uses fonts carried/defined in the referenced track.

'hind'—this track depends on the referenced hint track, i.e., it should only be used if the referenced hint track is used.

'vdep'—this track contains auxiliary depth video information for the referenced video track.

'vplx'—this track contains auxiliary parallax video information for the referenced video track.

'subt'—this track contains subtitle, timed text or overlay graphical information for the referenced track or any track in the alternate group to which the track belongs, if any.

'omet'—this track contains orientation information for the references track. According to one embodiment, a track including the tref box having the reference_type corresponds to a metadata track delivering orientation information. The track can reference a track delivering relevant media data via track_IDs. According to a different embodiment, a track including the tref box having the reference_type corresponds to a track delivering media data and may be able to reference a metadata track delivering orientation information via track_IDs.

In the embodiments mentioned earlier with reference to FIGS. 26 to 29, a method of storing orientation metadata entities indicating the same orientation information in a single sample of the same track has been explained.

On the other hand, the orientation metadata entities indicating the same orientation information can be stored in a manner of being divided into a different track. In this case, each sample can be configured to include a single orientation metadata entity. In particular, when the orientation metadata entities are included in a plurality of tracks in a manner of being divided, the orientation metadata entities can be synchronized by time information provided by an ISO BMFF. For example, the orientation metadata entities can be synchronized by DT (decoding time) provided by a Decoding Time to Sample ('stts') box of the ISO BMFF. More specifically, samples including the orientation metadata entities for orientation information of the same timing may have the same DT (decoding time) provided by 'stts' box.

In particular, if the orientation metadata entities indicating the same orientation information are stored in a manner of being divided into a different track, it is necessary to identify that the tracks have the same orientation information. When the orientation metadata entities indicating the same orientation information are stored in a manner of being divided into a different track, in order to identify that the tracks have the same orientation information, it may consider a method described in the following.

According to one embodiment, it may be able to define 'ombs' (orientation metadata base) as a new reference type value of TrackReferenceBox ('tref'). And, a track can be configured as a base track. Subsequently, it may be able to configure other tracks to refer to the base track with 'ombs' reference type. According to the embodiment, other tracks referring to the base track with the 'ombs' reference type have orientation information identical to that of the base track.

As a different embodiment, it may be able to define a new track group type of a TrackGroupBox ('trgr'). The TrackGroupBox ('trgr') corresponds to a box included in trackBox ('trak') and includes track_group_type indicating a grouping type.

It may be able to define 'omtg' (orientation metadata track group) as the new track group type of the TrackGroupBox ('trgr'). And, it may be able to configure tracks to have the same track_group_id value with the track group type of 'otmg'. According to the present embodiment, it may be able to indicate that tracks having the same track group ID value correspond to tracks storing the same orientation information with the track_group_type of 'omtg' within the TrackGroupBox.

Embodiment of Multiplexing an Orientation Metadata Stream of a Source/Sink Associated with a Video/Audio Stream with MPEG-2 TS and Signaling the Orientation Metadata Stream An embodiment of storing orientation information in a file format and signaling the orientation information has been explained with reference to FIGS. 26 to 29.

In the following description, an embodiment of multiplexing orientation information with MPEG-2 TS and signaling the orientation information is explained.

Orientation information corresponds to data associated with a video sample or an audio sample and can include orientation data of a source or a sink. In this case, the source may correspond to a camera or a microphone existing in the aforementioned production part of the capture space.

The orientation information associated with the video sample or the audio sample can be stored and signaled via MPEG-2 TS. In particular, the orientation information associated with the video sample or the audio sample can be included in the MPEG-2 TS.

The video sample or the audio sample can be coded by an access unit for presentation. Similarly, the orientation information associated with the video sample or the audio sample can be coded by an orientation access unit. In particular, orientation information having a form of timed metadata can be coded by an orientation access unit corresponding to an access unit (AU) for a media sample.

FIG. 30 is a diagram illustrating an orientation access unit including orientation metadata according to one embodiment of the present invention.

An orientation access unit can include fields illustrated in FIG. 30.

entity_count can indicate the number of orientation metadata entities existing in an access unit, i.e., an orientation access unit, of each orientation metadata.

Meanwhile, an orientation metadata entity used for the embodiment of storing and signaling the orientation information associated with the video sample or the audio sample via MPEG-2 TS is practically identical to an orientation metadata entity used for the embodiment using the file format. In particular, the aforementioned explanation on the orientation metadata entity can be applied to the embodiment using the MPEG-2 TS as it is within a range where a contradiction does not occur.

entity_size_bytes can indicate a length of bytes of an orientation metadata entity (orientation access unit) within an orientation access unit.

entity_encoding can indicate an encoding format of an orientation metadata entity included in an orientation access unit. For example, 0x00 and 0x01 can indicate a binary format and an XML format, respectively.

sensor_capability_included can indicate whether or not capability information of a sensor/device is included. In this case, the sensor/device may correspond to a sensor/device, which has measured orientation data included in an orientation metadata entity within an orientation access unit. And, the capability information can be included in each orientation metadata entity within an orientation access unit. According to one embodiment, if a value of the sensor_capability_included corresponds to '1', it may indicate that the capability information of the sensor/device, which has measured the orientation data, is included.

orientation_entity_code can indicate a code name of an orientation metadata entity. In particular, the orientation_entity_code may indicate the meaning of orientation information included in the orientation metadata entity. In particular, the orientation_entity_code can indicate orientation information measured by an orientation sensor (orientation_entity_code="ORIN").

orientation_sensor_capability_len can indicate a length of bytes of capability information of following orientation sensors. In particular, the orientation_sensor_capability_len can indicate a length of buyes of orin_cap.

As mentioned in the foregoing description, the orientation_entity_code can indicate a code name of an orientation metadata entity. If the orientation_entity_code corresponds to "ORIN", the orientation metadata entity can include the orin_cap.

The orin_cap can include detail information on capability of an orientation sensor. This may correspond to the aforementioned OrientationSensorCapabilityType.

The embodiment of storing and signaling the orientation information associated with the video sample or an audio sample via the MPEG-2 TS can further include DTS information and PTS information described in the following.

media_DTS may be practically identical to 33-bit DTS specified in a PES header. The media_DTS can indicate the timing at which corresponding orientation metadata entity information is decoded. Or, the media_DTS can be used for indicating an associated video/audio access unit. For example, in order to present a video/audio access unit having the same DTS value, information included in a corresponding orientation metadata entity can be used.

display_in_PTS may be practically identical to 33-bit PTS specified in a PES header. The display_in_PTS can indicate the timing at which corresponding orientation metadata entity information is presented. Or, the display_in_PTS can be used for indicating an associated video/audio access unit. For example, in order to present a video/audio access unit having the same PTS value, information included in a corresponding orientation metadata entity can be used.

As mentioned in the foregoing description, orientation_entity_code can indicate a code name of an orientation metadata entity. If the orientation_entity_code corresponds to "ORIN", the orientation metadata entity can include orientation.

The orientation can include orientation data obtained from an orientation sensor. This may correspond to the aforementioned OrientationSensorType.

Meanwhile, a part of the fields illustrated in the drawing can be selectively omitted.

According to one embodiment, a media_DTS field and/or a display in a PTS field may not be included in an orientation access unit. According to the present embodiment, it is able to use DTS information and PTS information included in a PES header.

According to one embodiment, an orientation access unit can be transmitted with a scheme similar to a scheme of transmitting an AU including a media sample.

According to a different embodiment, an orientation access unit can be transmitted via MPEG-2 TS in a manner of being included in an MPEG-2 private section.

FIG. 31 is a diagram illustrating an MPEG-2 private section according to one embodiment of the present invention.

Referring to FIG. 31, an MPEG-2 private section according to one embodiment of the present invention includes an orientation access unit and an information field.

table_id can identify a table to which the MPEG-2 private section belongs. In particular, the table_id corresponds to an identifier indicating that the MPEG-2 private section corresponds to a table including an orientation access unit.

section_syntax_indicator corresponds to an indicator. If a value of the section_syntax_indicator is configured by '1', a private section is concatenated after normal section syntax equal to or greater than a private_section_length field. If the value of the section_syntax_indicator is configured by '0', it may indicate that private_data_bytes is concatenated immediately after the private_section_length field.

A private_indicator field corresponds to a flag capable of being defined by a user.

A private_section_length field can describe the remaining number of bytes of a private section positioned immediately after the private_section_length field.

An orientation_access_unit( ) field corresponds to an orientation access unit.

The MPEG-2 private section, i.e., orientation_access_unit section( ) transmitting an orientation access unit, can be transmitted in a manner of being included in a single TS packet and an access unit of each position metadata may become a random access point.

Meanwhile, in order to make a receiver identify an MPEG-2 transport stream including an access unit, it may be able to define stream_type of the MPEG-2 transport stream including the access unit. And, it may be able to apply a value of the stream_type of the MPEG-2 transport stream including the access unit to system information. The system information can include PSI/PSIP (Program Specific Information/Program and System Information Protocol). According to one embodiment, the system information may correspond to Program association table (PAT) and program map table (PMT) of program-specific information (PSI).

Explanation on the PSI has been explained with reference to FIG. 21. The contents explained via FIG. 21 can be applied to the present explanation within a range where contradiction does not occur.

Meanwhile, if such a random value as '0x31' is applied to the stream_type of the PMT, it is able to make a receiver and the like recognize that the MPEG-2 transport stream corresponds to a is packet stream including an AU of orientation metadata. In particular, the stream_type field can indicate the MPEG-2 transport stream within a PMT section transmits an access unit for media orchestration.

According to one embodiment, position metadata information can be transmitted in a descriptor form.

FIG. 32 is a diagram illustrating an orientation metadata descriptor according to one embodiment of the present invention.

Referring to FIG. 32, an orientation metadata descriptor according to one embodiment of the present invention includes information described in the following.

entity_count can indicate the number of orientation metadata entities existing in an access unit of orientation metadata included in an associated MPEG-2 transport stream.

entity_size_bytes can indicate a length of bytes of an orientation metadata entity within an access unit of orientation metadata included in an associated MPEG-2 transport stream.

entity_encoding can indicate an encoding format of an orientation metadata entity included in an access unit of orientation metadata included in an associated MPEG-2 transport stream. For example, 0x00 and 0x01 can indicate a binary format and an XML format, respectively.

sensor_capability_included can indicate whether or not capability information of a sensor/device is included. In this case, the sensor/device may correspond to a sensor/device, which has measured orientation data included in an orientation metadata entity within an orientation access unit of orientation metadata included in an associated MPEG-2 transport stream. If a value of the sensor_capability_included corresponds to '1', it may indicate that the capability information of the sensor/device, which has measured the orientation data, is included in a corresponding descriptor or an orientation metadata entity.

orientation_entity_code can indicate a code name of an orientation metadata entity included in an access unit of orientation metadata included in an associated MPEG-2 transport stream. In particular, the orientation_entity_code can indicate orientation information measured by an orientation sensor (orientation_entity_code="ORIN").

orientation_sensor_capability_len can indicate a length of bytes of orin_cap.

The orin_cap can include detail information on capability of an orientation sensor. This may correspond to the aforementioned OrientationSensorCapabilityType.

Since an orientation metadata descriptor (orientation extension descriptor) is transmitted one time only according to an event or a program, the orientation metadata descriptor can be signaled using a descriptor of PMT. According to one embodiment, the orientation metadata descriptor (orientation extension descriptor) may appear at a base stream loop of a PID providing orientation information.

According to a different embodiment, the orientation extension descriptor can be transmitted in a manner of being included in extension_descriptor of MPEG-2 TS.

FIG. 33 is a diagram illustrating a shape of an orientation metadata descriptor transmitted in an extension_descriptor form of MPEG-2 according to one embodiment of the present invention.

According to the embodiment illustrated in FIG. 33, if a descriptor tag of extenstion_descriptor has a value of 0x11, it may indicate that the extenstion_descriptor corresponds to an orientation metadata descriptor. In particular, the descriptor tag of the extenstion_descriptor can indicate that the extenstion_descriptor corresponds to a timed metadata such as an orientation metadata descriptor.

According to an embodiment of the present invention, a broadcast signal transmission device is disclosed.

Figure 34:
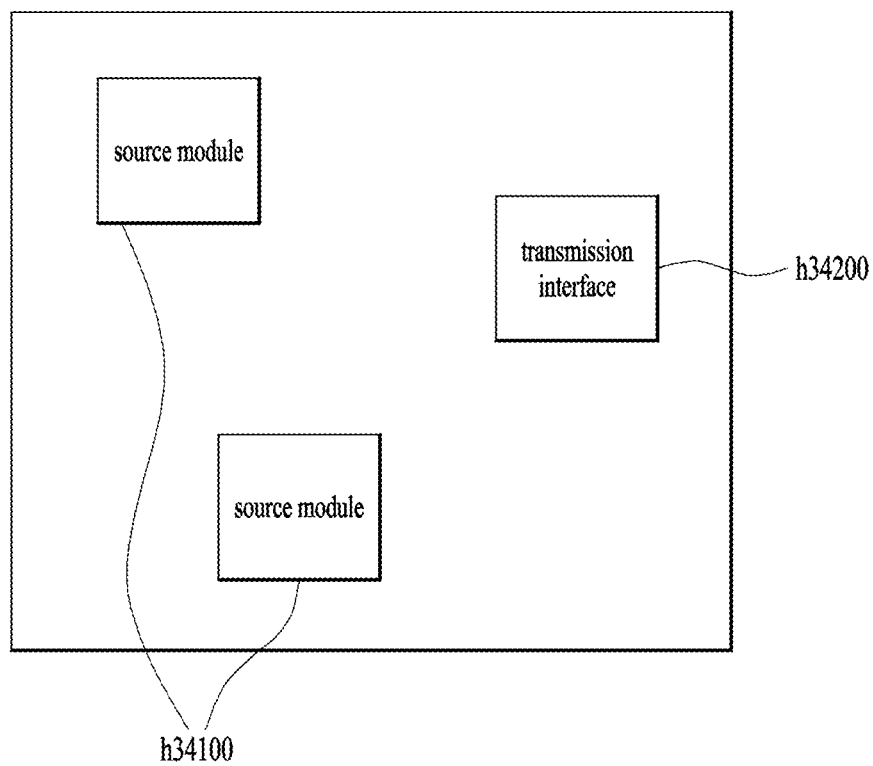
FIG. 34 is a diagram illustrating a functional configuration of a broadcast signal transmission device according to one embodiment of the present invention.

FIG. 34 is a diagram illustrating a functional configuration of a broadcast signal transmission device according to one embodiment of the present invention.

Referring to FIG. 34, a broadcast signal transmission device according to one embodiment of the present invention can include a source module h34100 and a transmission interface h34200.

According to one embodiment, the broadcast signal transmission device can further include a processor.

The source module and the processor may correspond to the source and the M-processor mentioned earlier in FIG. 3 and FIG. 4, respectively.

The source module can be equipped with one or two or more source modules. The source module can generate a timed media data stream and/or a timed metadata stream. In this case, the timed metadata stream may correspond to a meta stream for timed media data.

The source module can generate timed media data. If a source module or a different source module generates timed media data stream, the source or the different source can generate a timed metadata stream related to the generated timed media data stream.

The timed metadata stream may correspond to a position metadata stream or an orientation metadata stream.

The position metadata stream can include position information itself and capability information of a sensor for sensing the position information. Similarly, the orientation metadata stream can include orientation information itself and capability information of a sensor for sensing the orientation information. The position information itself corresponds to position information sensed by a position sensor. The orientation information itself may correspond to orientation information sensed by an orientation sensor.

Regarding the position metadata stream, explanation on the position metadata stream is described in FIGS. 5 to 13. The contents can be applied to the present explanation. More specifically, the description mentioned earlier in FIGS. 10 to 13 can be applied to the contents of the position information itself. The description mentioned earlier in FIGS. 5 to 9 can be applied to the capability information of the sensor for sensing the position information.

Regarding the orientation metadata stream, explanation on the orientation metadata stream is described in FIGS. 24 to 25. The contents can be applied to the present explanation. More specifically, the description mentioned earlier in FIG. 24 can be applied to the contents of the orientation information itself. The description mentioned earlier in FIG. 25 can be applied to the capability information of the sensor for sensing the orientation information.

Specifically, the position metadata stream can be generated by a sensor measuring a position and the orientation metadata stream can be generated by a sensor measuring orientation.

The source module may correspond to a media device such as a camera, a sensor, or a media device to/in which a sensor is attached or included.

The source module can output a timed media data stream and/or a timed metadata stream for the timed media data stream. The timed media data stream and/or the timed metadata stream outputted by the source module can be inputted to the transmission interface. According to an embodiment, the timed media data stream and/or the timed metadata stream outputted by the source module can be inputted to a processor.

Meanwhile, in order to generate the timed media data stream and/or the timed metadata stream, a media encoder and/or an additional data encoder can be installed. Or, a media encoder and/or a data encoder can be installed in the source module.

The processor can receive the timed media data stream and/or the timed metadata stream generated by the source module. The processor can process the received timed media data stream and/or the timed metadata stream.

In this case, the processor may correspond to the M-processor mentioned earlier in FIGS. 3 and 4. The processor can generate and output orchestration data. In particular, according to one embodiment, the processor can further perform a function of the aforementioned orchestrator. As mentioned in the foregoing description, orchestration data can provide information on a correlation between the timed media data stream and the timed metadata stream.

Meanwhile, the timed media data stream and/or the timed metadata stream can be formatted by a file format or a form of a transmission stream. To this end, it may additionally have a formatter and/or a packetizer. Or, a formatter and/or a packetizer can be installed in the source module or the processor. According to one embodiment, the file format may correspond to ISO BMFF and the transmission stream may correspond to MPEG-2 TS.

Each of the timed media data stream and the timed metadata stream can be stored in an access unit in a sample unit. An access unit including a sample for the timed media data stream and an access unit including a sample for the timed metadata stream can be referred to as a first access unit and a second access unit, respectively.

Meanwhile, besides the access unit in a sample unit, sample entry information or sample description information including metadata information on samples can be transmitted in a manner of being included in an ISO BMFF file or MPEG-2 TS.

<When Time Metadata Stream is Formatted by ISO BMFF File>

Regarding an ISO BMFF file including a timed metadata stream, explanation on the ISO BMFF file is described in FIGS. 14 to 18 and FIGS. 26 to 29. The contents can be applied to the present explanation. More specifically, FIGS. 14 to 18 explain a case that a timed metadata stream corresponds to a position metadata stream and FIGS. 26 to 29 explain a case that a timed metadata stream corresponds to an orientation metadata stream.

When a metadata stream is formatted by an ISO BMFF file format, sample entry information can be included in a moov box or a moof box of the ISO BMFF. The sample entry information included in the moov box or the moof box can provide metadata information on each sample included in a mdat box. A sample of a timed metadata stream can include sample information on the sample and sample information stored in each sample can override the sample entry information. The sample information stored in each sample can provide more dynamic information compared to the sample entry information.

The sample entry information can include information on a single entity or information on two or more entities (encoding format of sensed data, capability information, etc.).

Entity-related information included in the sample entry information can include sensing-related information (encoding format, capability information of a sensor, etc.) to be sensed by a sensor. For example, if a timed metadata stream corresponds to a position metadata stream, first entity-related information includes information related to a first position sensor, second entity-related information includes information related to a second position sensor, and third entity-related information can include information related to a third position sensor. More specifically, the first position sensor, the second position sensor, and the third position sensor may correspond to a GPS sensor, a relative position sensor, and an altitude sensor, respectively.

The entry-related information included in the sample entry information can include capability flag information. The capability flag information included in the entity-related information can indicate whether or not capability information on a sensor is included in the entity-related information. The sample entry information may or may not include capability information on a sensor according to the capability flag information.

A sample can include sample information and the sample information can include one or two or more entities.

Each entity included in the sample information can include sensed data sensed by each sensor. For example, if a timed metadata stream corresponds to a position metadata stream, a first entity includes sensed data sensed by a first position sensor, a second entity includes sensed data sensed by a second position sensor, and a third entity can include sensed data sensed by a third position sensor. More specifically, the first position sensor, the second position sensor, and the third position sensor may correspond to a GPS sensor, a relative position sensor, and an altitude sensor, respectively.

An entity included in sample information can include capability flag information. The capability flag information included in an entity can indicate whether or not capability information on a sensor corresponding to the entity is included. In particular, sample entry information may or may not include capability information on a sensor according to the capability flag information.

According to one embodiment, each entity of the sample entry information includes capability information and each entity of the sample information may not include the capability information. Compared to a sensed value, since the capability information corresponds to static information, it may be preferable for each sample to use the capability information included in the sample entry information.

<When Time Metadata Stream is Encapsulated by MPEG-2 TS>

Regarding MPEG-2 TS stream including a timed metadata stream, explanation on the MPEG-2 TS stream is described in FIGS. 19 to 23 and FIGS. 30 to 33. The contents can be applied to the present explanation. More specifically, FIGS. 19 to 23 explain a case that a timed metadata stream corresponds to a position metadata stream and FIGS. 30 to 33 explain a case that a timed metadata stream corresponds to an orientation metadata stream.

When a timed metadata stream is encapsulated by MPEG-2 TS, sample description information can be included in a PMT of the MPEG-2 TS. The sample description information included in the PMT can provide metadata information on each sample included in a PES packet. A sample of a timed metadata stream can include sample information on the sample and sample information stored in each sample can override the sample description information. The sample information stored in each sample can provide more dynamic information compared to the sample description information.

The sample description information can include information on a single entity or information on two or more entities (encoding format of sensed data, capability information, etc.).

Entity-related information included in the sample description information can include sensing data-related information (encoding format, capability information, etc.) to be sensed by a sensor. For example, if a timed metadata stream corresponds to a position metadata stream, first entity-related information includes information related to a first position sensor, second entity-related information includes information related to a second position sensor, and third entity-related information can include information related to a third position sensor. More specifically, the first position sensor, the second position sensor, and the third position sensor may correspond to a GPS sensor, a relative position sensor, and an altitude sensor, respectively.

The entry-related information included in the sample description information can include capability flag information. The capability flag information included in the entity-related information can indicate whether or not capability information on a sensor is included in the entity-related information. The sample description information may or may not include capability information on a sensor according to the capability flag information.

A sample can include sample information and the sample information can include one or two or more entities.

Each entity included in the sample information can include sensed data sensed by each sensor. For example, if a timed metadata stream corresponds to a position metadata stream, a first entity includes sensed data sensed by a first position sensor, a second entity includes sensed data sensed by a second position sensor, and a third entity can include sensed data sensed by a third position sensor. More specifically, the first position sensor, the second position sensor, and the third position sensor may correspond to a GPS sensor, a relative position sensor, and an altitude sensor, respectively.

An entity included in sample information can include capability flag information. The capability flag information included in an entity can indicate whether or not capability information on a sensor corresponding to the entity is included. In particular, sample description information may or may not include capability information on a sensor according to the capability flag information.

According to one embodiment, each entity of the sample description information includes capability information and each entity of the sample information may not include the capability information. Compared to a sensed value, since the capability information corresponds to static information, it may be preferable for each sample to use the capability information included in the sample description information.

A transmission interface can receive a timed media data stream and/or a timed metadata stream generated by a source module. The transmission interface may directly receive a timed media data stream and/or a timed metadata stream from a reception module or may receive the timed media data stream and/or the timed metadata stream through a processor.

According to one embodiment, the transmission interface can receive an orchestration data stream from the processor.

The transmission interface can transmit a file format or a transmission stream via a broadcast network and/or Internet. The transmission interface can transmit a data signal including an ISO file or MPEG-2 TS via a transmission network. According to one embodiment, the transmission network may correspond to a broadcast network. And, according to one embodiment, the data signal can further include an orchestration data stream.

According to a different embodiment of the present invention, a method of transmitting a broadcast signal is disclosed.

Figure 35:
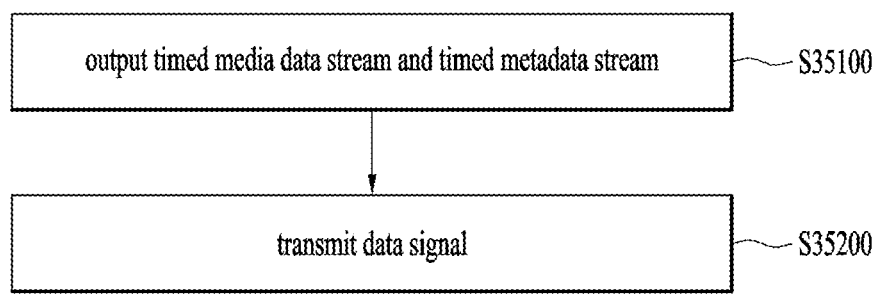
FIG. 35 is a flowchart illustrating a method of transmitting a broadcast signal according to one embodiment of the present invention.

FIG. 35 is a flowchart illustrating a method of transmitting a broadcast signal according to one embodiment of the present invention.

A method of transmitting a broadcast signal according to one embodiment of the present invention can include the steps of outputting a timed media data stream and a timed metadata stream [S35100] and transmitting a broadcast signal [S35200].

According to one embodiment of the present invention, the method can further include the step of receiving and processing a timed media data stream and a timed metadata stream.

According to one embodiment of the present invention, the method can be performed by a configuration element included in the broadcast signal transmission device mentioned earlier with reference to FIG. 34.

The step of outputting the timed media data stream and the timed metadata stream for the timed media data stream can be performed by one or more source modules.

The source module can be equipped with one or two or more source modules. The source module can generate a timed media data stream and/or a timed metadata stream. In this case, the timed metadata stream may correspond to a meta stream for timed media data.

The source module can generate timed media data. If a source module or a different source module generates timed media data stream, the source or the different source can generate a timed metadata stream related to the generated timed media data stream.

The timed metadata stream may correspond to a position metadata stream or an orientation metadata stream.

The position metadata stream can include position information itself and capability information of a sensor for sensing the position information. Similarly, the orientation metadata stream can include orientation information itself and capability information of a sensor for sensing the orientation information. The position information itself corresponds to position information sensed by a position sensor. The orientation information itself may correspond to orientation information sensed by an orientation sensor.

Regarding the position metadata stream, explanation on the position metadata stream is described in FIGS. 5 to 13. The contents can be applied to the present explanation. More specifically, the description mentioned earlier in FIGS. 10 to 13 can be applied to the contents of the position information itself. The description mentioned earlier in FIGS. 5 to 9 can be applied to the capability information of the sensor for sensing the position information.

Regarding the orientation metadata stream, explanation on the orientation metadata stream is described in FIGS. 24 to 25. The contents can be applied to the present explanation. More specifically, the description mentioned earlier in FIG. 24 can be applied to the contents of the orientation information itself. The description mentioned earlier in FIG. 25 can be applied to the capability information of the sensor for sensing the orientation information.

Specifically, the position metadata stream can be generated by a sensor measuring a position and the orientation metadata stream can be generated by a sensor measuring orientation.

The source module may correspond to a media device such as a camera, a sensor, or a media device to/in which a sensor is attached or included.

The source module can output a timed media data stream and/or a timed metadata stream for the timed media data stream. The timed media data stream and/or the timed metadata stream outputted by the source module can be inputted to the transmission interface. According to an embodiment, the timed media data stream and/or the timed metadata stream outputted by the source module can be inputted to a processor.

Meanwhile, in order to generate the timed media data stream and/or the timed metadata stream, a media encoder and/or an additional data encoder can be installed. Or, a media encoder and/or a data encoder can be installed in the source module.

The step of receiving and processing the timed media data stream and the timed metadata stream can be performed by the processor mentioned earlier in FIG. 34.

The processor can receive the timed media data stream and/or the timed metadata stream generated by the source module. The processor can process the received timed media data stream and/or the timed metadata stream.

In this case, the processor may correspond to the M-processor mentioned earlier in FIGS. 3 and 4. The processor can generate and output orchestration data. In particular, according to one embodiment, the processor can further perform a function of the aforementioned orchestrator. As mentioned in the foregoing description, orchestration data can provide information on a correlation between the timed media data stream and the timed metadata stream.

Meanwhile, the timed media data stream and/or the timed metadata stream can be formatted by a file format or a form of a transmission stream. To this end, it may additionally have a formatter and/or a packetizer. Or, a formatter and/or a packetizer can be installed in the source module or the processor. According to one embodiment, the file format may correspond to ISO BMFF and the transmission stream may correspond to MPEG-2 TS.

Each of the timed media data stream and the timed metadata stream can be stored in an access unit in a sample unit. An access unit including a sample for the timed media data stream and an access unit including a sample for the timed metadata stream can be referred to as a first access unit and a second access unit, respectively.

Meanwhile, besides the access unit in a sample unit, sample entry information or sample description information including metadata information on samples can be transmitted in a manner of being included in an ISO BMFF file or MPEG-2 TS.

<When Time Metadata Stream is Formatted by ISO BMFF File>

Regarding an ISO BMFF file including a timed metadata stream, explanation on the ISO BMFF file is described in FIGS. 14 to 18 and FIGS. 26 to 29. The contents can be applied to the present explanation. More specifically, FIGS. 14 to 18 explain a case that a timed metadata stream corresponds to a position metadata stream and FIGS. 26 to 29 explain a case that a timed metadata stream corresponds to an orientation metadata stream.

When a metadata stream is formatted by an ISO BMFF file format, sample entry information can be included in a moov box or a moof box of the ISO BMFF. The sample entry information included in the moov box or the moof box can provide metadata information on each sample included in a mdat box. A sample of a timed metadata stream can include sample information on the sample and sample information stored in each sample can override the sample entry information. The sample information stored in each sample can provide more dynamic information compared to the sample entry information.

The sample entry information can include information on a single entity or information on two or more entities (encoding format of sensed data, capability information, etc.).

Entity-related information included in the sample entry information can include sensing-related information (encoding format, capability information of a sensor, etc.) to be sensed by a sensor. For example, if a timed metadata stream corresponds to a position metadata stream, first entity-related information includes information related to a first position sensor, second entity-related information includes information related to a second position sensor, and third entity-related information can include information related to a third position sensor. More specifically, the first position sensor, the second position sensor, and the third position sensor may correspond to a GPS sensor, a relative position sensor, and an altitude sensor, respectively.

The entry-related information included in the sample entry information can include capability flag information. The capability flag information included in the entity-related information can indicate whether or not capability information on a sensor is included in the entity-related information. The sample entry information may or may not include capability information on a sensor according to the capability flag information.

A sample can include sample information and the sample information can include one or two or more entities.

Each entity included in the sample information can include sensed data sensed by each sensor. For example, if a timed metadata stream corresponds to a position metadata stream, a first entity includes sensed data sensed by a first position sensor, a second entity includes sensed data sensed by a second position sensor, and a third entity can include sensed data sensed by a third position sensor. More specifically, the first position sensor, the second position sensor, and the third position sensor may correspond to a GPS sensor, a relative position sensor, and an altitude sensor, respectively.

An entity included in sample information can include capability flag information. The capability flag information included in an entity can indicate whether or not capability information on a sensor corresponding to the entity is included. In particular, sample entry information may or may not include capability information on a sensor according to the capability flag information.

According to one embodiment, each entity of the sample entry information includes capability information and each entity of the sample information may not include the capability information. Compared to a sensed value, since the capability information corresponds to static information, it may be preferable for each sample to use the capability information included in the sample entry information.

<When Time Metadata Stream is Encapsulated by MPEG-2 TS>

Regarding MPEG-2 TS stream including a timed metadata stream, explanation on the MPEG-2 TS stream is described in FIGS. 19 to 23 and FIGS. 30 to 33. The contents can be applied to the present explanation. More specifically, FIGS. 19 to 23 explain a case that a timed metadata stream corresponds to a position metadata stream and FIGS. 30 to 33 explain a case that a timed metadata stream corresponds to an orientation metadata stream.

When a timed metadata stream is encapsulated by MPEG-2 TS, sample description information can be included in a PMT of the MPEG-2 TS. The sample description information included in the PMT can provide metadata information on each sample included in a PES packet. A sample of a timed metadata stream can include sample information on the sample and sample information stored in each sample can override the sample description information. The sample information stored in each sample can provide more dynamic information compared to the sample description information.

The sample description information can include information on a single entity or information on two or more entities (encoding format of sensed data, capability information, etc.).

Entity-related information included in the sample description information can include sensing data-related information (encoding format, capability information, etc.) to be sensed by a sensor. For example, if a timed metadata stream corresponds to a position metadata stream, first entity-related information includes information related to a first position sensor, second entity-related information includes information related to a second position sensor, and third entity-related information can include information related to a third position sensor. More specifically, the first position sensor, the second position sensor, and the third position sensor may correspond to a GPS sensor, a relative position sensor, and an altitude sensor, respectively.

The entry-related information included in the sample description information can include capability flag information. The capability flag information included in the entity-related information can indicate whether or not capability information on a sensor is included in the entity-related information. The sample description information may or may not include capability information on a sensor according to the capability flag information.

A sample can include sample information and the sample information can include one or two or more entities.

Each entity included in the sample information can include sensed data sensed by each sensor. For example, if a timed metadata stream corresponds to a position metadata stream, a first entity includes sensed data sensed by a first position sensor, a second entity includes sensed data sensed by a second position sensor, and a third entity can include sensed data sensed by a third position sensor. More specifically, the first position sensor, the second position sensor, and the third position sensor may correspond to a GPS sensor, a relative position sensor, and an altitude sensor, respectively.

An entity included in sample information can include capability flag information. The capability flag information included in an entity can indicate whether or not capability information on a sensor corresponding to the entity is included. In particular, sample description information may or may not include capability information on a sensor according to the capability flag information.

According to one embodiment, each entity of the sample description information includes capability information and each entity of the sample information may not include the capability information. Compared to a sensed value, since the capability information corresponds to static information, it may be preferable for each sample to use the capability information included in the sample description information.

The step of transmitting a broadcast signal can be performed by the transmission interface mentioned earlier in FIG. 34.

A transmission interface can receive a timed media data stream and/or a timed metadata stream generated by a source module. The transmission interface may directly receive a timed media data stream and/or a timed metadata stream from a reception module or may receive the timed media data stream and/or the timed metadata stream through a processor.

According to one embodiment, the transmission interface can receive an orchestration data stream from the processor.

The transmission interface can transmit a file format or a transmission stream via a broadcast network and/or Internet. The transmission interface can transmit a data signal including an ISO file or MPEG-2 TS via a transmission network. According to one embodiment, the transmission network may correspond to a broadcast network. And, according to one embodiment, the data signal can further include an orchestration data stream.

According to a further different embodiment of the present invention, a broadcast signal reception device is disclosed.

A broadcast signal reception device according to a further different embodiment of the present invention may correspond to the broadcast signal transmission device mentioned earlier with reference to FIG. 34. This corresponding relationship has been explained via the architecture mentioned earlier in FIGS. 3 and 4.

A broadcast signal reception device according to one embodiment of the present invention can include one or more sink modules and a reception interface.

The reception interface can receive a file format and a transmission stream through a broadcast network and/or Internet. The reception interface can receive a data signal including an ISO BMFF file and MPEG-2 TS via a transmission network. According to one embodiment, the transmission network may correspond to a broadcast network. The reception interface can output the ISO BMFF file or the MPEG-2 TS included in the data signal via a sink module.

According to one embodiment, the data signal can further include an orchestration data stream and the reception interface can output the received orchestration data stream via the sink module.

The sink module may correspond to the sink mentioned earlier in FIGS. 3 and 4.

The sink module can receive an input of an ISO file or MPEG-2 TS from the reception interface.

The sink module can parse or de-capsulate the ISO BMFF file or the MPEG-2 TS using a parser or a de-capsulator included in the sink module.

The sink module can decode a timed media data stream and/or a timed metadata stream included in the ISO BMFF file or the MPEG-2 TS using a decoder included in the sink module.

The sink module can present a timed media data using position information or orientation information included in a timed metadata stream. According to one embodiment, the sink module can present the timed media data further using an orchestration data stream.

A method of receiving a broadcast signal is disclosed according to a further different embodiment of the present invention.

A method of receiving a broadcast signal according to one embodiment of the present invention can include the steps of receiving a broadcast signal and decoding a timed media data stream and a timed metadata stream included in the broadcast signal.

According to a different embodiment of the present invention, the method of receiving a broadcast signal can be performed via a configuration element included in the aforementioned broadcast signal reception device.

A reception interface can receive a file format and a transmission stream through a broadcast network and/or Internet. The reception interface can receive a data signal including an ISO BMFF file and MPEG-2 TS via a transmission network. According to one embodiment, the transmission network may correspond to a broadcast network. The reception interface can output the ISO BMFF file or the MPEG-2 TS included in the data signal via a sink module. According to one embodiment, the data signal can further include an orchestration data stream and the reception interface can output the received orchestration data stream via a sink module.

The sink module may correspond to the sink mentioned earlier in FIGS. 3 and 4.

The sink module can receive an input of an ISO file or MPEG-2 TS from the reception interface.

The sink module can parse or de-capsulate the ISO BMFF file or the MPEG-2 TS using a parser or a de-capsulator included in the sink module.

The sink module can decode a timed media data stream and/or a timed metadata stream included in the ISO BMFF file or the MPEG-2 TS using a decoder included in the sink module.

The sink module can present a timed media data using position information or orientation information included in a timed metadata stream. According to one embodiment, the sink module can present the timed media data further using an orchestration data stream.

According to a further different embodiment, a broadcast signal transmission device may correspond to the aforementioned one source module. The one source module may correspond to a media device to which one or more sensors are attached or included.

The broadcast signal transmission device can include a media data generating unit, a metadata generating unit, and a transmitting unit. The broadcast signal transmission device can further include a file formatter or a packetizer.

The media data generating unit can generate a timed media data stream and the metadata generating unit can generate a timed metadata stream. The media data generating unit may correspond to a media encoder and the metadata generating unit may correspond to a data encoder. The media data generating unit and the metadata generating unit may correspond to logically distinguished elements included in a single encoder.

The file formatter can format a timed media data stream and a timed metadata stream with an ISO BMFF file format.

The packetizer can encapsulate a timed media data stream and a timed metadata stream with MPEG-2 TS.

The transmitting unit can transmit an ISO BMFF file or MPEG-2 TS via a broadcast network and/or Internet.

For explanation on a timed media data stream and a timed metadata stream, explanation on file formatting and packetizing, and explanation on transmission via a broadcast network/Internet, it may refer to the contents mentioned earlier with reference to FIGS. 34 and 35.

According to a further different embodiment of the present invention, a method of transmitting a broadcast signal can be performed by a broadcast signal reception device corresponding to the aforementioned one source module.

According to a further different embodiment of the present invention, the broadcast signal reception device may correspond to the aforementioned one sink module. In this case, the one sink module may correspond to a media device capable of performing presentation.

According to a further different embodiment of the present invention, the broadcast signal reception device corresponding to one sink module may correspond to the broadcast signal transmission device corresponding to the aforementioned one source module. This corresponding relationship has been explained via the architecture mentioned earlier in FIGS. 3 and 4.

The broadcast signal reception device can include a receiving unit and a decoder. The broadcast signal reception device can further include a file parser or a de-capsulator.

The receiving unit can receive an ISO BMFF file or MPEG-2 TS via a broadcast network and/or Internet. The receiving unit can receive a data signal including the ISO BMFF file or MPEG-2 TS. According to one embodiment, the receiving unit can include a tuner for receiving a broadcast signal.

The decoder can decode a timed media data stream and/or a timed metadata stream. According to one embodiment, the decoder can include a media decoder for decoding a timed media data stream and a metadata decoder for decoding a timed metadata stream.

The file parser can parse a timed media data stream and/or a timed metadata stream formatted with an ISO BMFF file.

The packetizer can parse or de-capsulate a timed media data stream and/or a timed metadata stream encapsulated with MPEG-2 TS.

According to one embodiment, the file parser or the packetizer can be included in the decoder.

According to a further different embodiment of the present invention, a method of receiving a broadcast signal can be performed by a broadcast signal reception device corresponding to the aforementioned one sink module.

The internal components of the apparatus may be processors that execute consecutive processes stored in a memory or other hardware components. These may be located inside/outside the apparatus.

In some embodiments, the above-described modules may be omitted, or may be replaced by other modules that perform the same or similar operations.

The above-described parts, modules, or units may be processors or hardware parts that execute consecutive processes stored in a memory (or a storage unit). The steps described in the above-described embodiments can be performed by processors or hardware parts. The modules/blocks/units described in the above-described embodiments can operate as hardware/processors. In addition, the methods proposed by the present invention can be executed as code. Such code can be written on a processor-readable storage medium and thus can be read by a processor provided by an apparatus.

While the present invention has been described with reference to separate drawings for the convenience of description, new embodiments may be implemented by combining embodiments illustrated in the respective drawings. As needed by those skilled in the art, designing a computer-readable recording medium, in which a program for implementing the above-described embodiments is recorded, falls within the scope of the present invention.

The apparatus and method according to the present invention is not limitedly applied to the constructions and methods of the embodiments as previously described; rather, all or some of the embodiments may be selectively combined to achieve various modifications.

Meanwhile, the method according to the present specification may be implemented as code that can be written on a processor-readable recording medium and thus read by a processor provided in a network device. The processor-readable recording medium may be any type of recording device in which data are stored in a processor-readable manner. The processor-readable recording medium may include, for example, read only memory (ROM), random access memory (RAM), compact disc read only memory (CD-ROM), magnetic tape, a floppy disk, and an optical data storage device, and may be implemented in the form of a carrier wave transmitted over the Internet. In addition, the processor-readable recording medium may be distributed over a plurality of computer systems connected to a network such that processor-readable code is written thereto and executed therefrom in a decentralized manner.

In addition, it will be apparent that, although the preferred embodiments have been shown and described above, the present specification is not limited to the above-described specific embodiments, and various modifications and variations can be made by those skilled in the art to which the present invention pertains without departing from the gist of the appended claims. Thus, it is intended that the modifications and variations should not be understood independently of the technical spirit or prospect of the present specification.

Those skilled in the art will appreciate that the present invention may be carried out in other specific ways than those set forth herein without departing from the spirit and essential characteristics of the present invention. Therefore, the scope of the invention should be determined by the appended claims and their legal equivalents, rather than by the above description, and all changes that fall within the meaning and equivalency range of the appended claims are intended to be embraced therein.

In addition, the present specification describes both a product invention and a method invention, and descriptions of the two inventions may be complementarily applied as needed.

MODE FOR INVENTION

Various embodiments have been described in the best mode for carrying out the invention.

INDUSTRIAL APPLICABILITY

The present invention is usable in a broadcasting field.

Those skilled in the art will appreciate that the present invention may be carried out in other specific ways than those set forth herein without departing from the spirit and essential characteristics of the present invention. Therefore, the scope of the invention should be determined by the appended claims and their legal equivalents, rather than by the above description, and all changes that fall within the meaning and equivalency range of the appended claims are intended to be embraced therein.

What is claimed is:

1. An apparatus configured to transmit a data signal, the apparatus comprising:
   an encoder configured to generate (i) timed media data having a first intrinsic timeline and (ii) timed metadata having a second intrinsic timeline for the timed media data,
   wherein the timed metadata includes (i) position metadata that describes a position metadata entity for the apparatus and (ii) orientation metadata that describes an orientation metadata entity for the apparatus,
   wherein the position metadata entity includes (i) entity count information representing a number of position metadata entities, (ii) sensor capability information representing a capability for the position metadata, and (iii) position entity code information representing a type of the position metadata,
   wherein, based on the position entity code information having a first value, the position entity code information represents position information that is related to a global position, and
   wherein, based on the position entity code information having a second value, the position entity code information represents position information that is related to an altitude position;
   a circuit configured to format the timed metadata and the timed media data based on a transport protocol; and
   a transmitter configured to transmit the timed metadata and the timed media data.

2. The apparatus according to claim 1,
   wherein the timed metadata and the timed media data are formatted based on an ISO Base Media File Format (ISO BMFF).

3. The apparatus according to claim 2,
   wherein each sample of an ISO BMFF file includes the position metadata entity or the orientation metadata entity.

4. The apparatus according to claim 3,
   wherein a sample entry of the ISO BMFF file includes information for describing the position metadata entity or the orientation metadata entity in the each sample.

5. The apparatus according to claim 1,
   wherein the timed metadata and the timed media data are formatted based on a MPEG-2 system, and the timed metadata is stored in access units.

6. The apparatus according to claim 5,
   wherein the access units include an access unit for position metadata having the position metadata entity or an access unit for orientation metadata having the orientation metadata entity.

7. The apparatus according to claim 6,
   wherein a timed metadata descriptor is signaled based on Program Map Table (PMT), and
   wherein the timed metadata descriptor includes type information describing a type of metadata that is present in each of the access units.

8. The apparatus according to claim 7,
   wherein the timed metadata descriptor describes static information on the position metadata or the orientation metadata.

9. An apparatus configured to receive a data signal, the apparatus comprising:
   a receiver configured to receive timed media data and timed metadata for the timed media data,
   wherein the timed media data has a first intrinsic timeline, and wherein the timed metadata has a second intrinsic timeline, and
   wherein the timed metadata includes (i) position metadata that describes a position metadata entity for a device performing as a source and (ii) orientation metadata that describes an orientation metadata entity for the device performing as the source,
   wherein the position metadata entity includes (i) entity count information representing a number of position metadata entities, (ii) sensor capability information representing a capability for the position metadata, and (iii) position entity code information representing a type of the position metadata,
   wherein, based on the position entity code information having a first value, the position entity code information represents position information that is related to a global position, and
   wherein, based on the position entity code information having a second value, the position entity code information represents position information that is related to an altitude position;
   a circuit configured to parse the timed metadata and the timed media data formatted based on a transport protocol; and
   a decoder configured to decode the timed metadata and the timed media data.

10. A method for receiving a data signal by a device configured to perform as a sink, the method comprising:
    receiving timed media data and timed metadata for the timed media data,
    wherein the timed media data has a first intrinsic timeline, and wherein the timed metadata has a second intrinsic timeline, and
    wherein the timed metadata includes (i) position metadata that describes a position metadata entity for a device performing as a source and (ii) orientation metadata that describes an orientation metadata entity for the device performing as the source,
    wherein the position metadata entity includes (i) entity count information representing a number of position metadata entities, (ii) sensor capability information representing a capability for the position metadata, and (iii) position entity code information representing a type of the position metadata,
    wherein, based on the position entity code information having a first value, the position entity code information represents position information that is related to a global position, and
    wherein, based on the position entity code information having a second value, the position entity code information represents position information that is related to an altitude position;

parsing the timed metadata and the timed media data formatted based on a transport protocol; and decoding the timed metadata and the timed media data.

11. The method according to claim 10,
wherein the timed metadata and the timed media data are formatted based on an ISO Base Media File Format (ISO BMFF).

12. The method according to claim 11,
wherein each sample of an ISO BMFF file includes the position metadata entity or the orientation metadata entity.

13. The method according to claim 12,
wherein a sample entry of the ISO BMFF file includes information for describing the position metadata entity or the orientation metadata entity in the each sample.

14. The method according to claim 10,
wherein the timed metadata and the timed media data are formatted based on a MPEG-2 system, and the timed metadata is stored in access units.

15. The method according to claim 14,
wherein the access units include an access unit for position metadata having the position metadata entity or an access unit for orientation metadata having the orientation metadata entity.

16. The method according to claim 15,
wherein a timed metadata descriptor is signaled based on Program Map Table (PMT), and
wherein the timed metadata descriptor includes type information describing a type of metadata that is present in each of the access units.

17. The method according to claim 16,
wherein the timed metadata descriptor describes static information on the position metadata or the orientation metadata.

18. A method for transmitting a data signal by an apparatus, the method comprising:
generating (i) timed media data having a first intrinsic timeline and (ii) timed metadata having a second intrinsic timeline for the timed media data,
wherein the timed metadata includes (i) position metadata that describes a position metadata entity for the apparatus and (ii) orientation metadata that describes an orientation metadata entity for the apparatus,
wherein a position metadata entity includes (i) entity count information representing a number of position metadata entities, (ii) sensor capability information representing a capability for the position metadata, and (iii) position entity code information representing a type of the position metadata,
wherein, based on the position entity code information having a first value, the position entity code information represents position information that is related to a global position, and
wherein, based on the position entity code information having a second value, the position entity code information represents position information that is related to an altitude position;
formatting the timed metadata and the timed media data based on a transport protocol; and
transmitting the timed metadata and the timed media data.

* * * * *